US011249194B2

(12) United States Patent
Crouch et al.

(10) Patent No.: US 11,249,194 B2
(45) Date of Patent: Feb. 15, 2022

(54) AUTONOMOUS VEHICLE LIDAR SYSTEM USING A WAVEGUIDE ARRAY

(71) Applicant: BLACKMORE SENSORS AND ANALYTICS LLC, Palo Alto, CA (US)

(72) Inventors: Stephen C. Crouch, McFarland, WI (US); Edward Angus, Bozeman, MT (US); Michelle Milvich, Livingston, MT (US)

(73) Assignee: BLACKMORE SENSORS & ANALYTICS, LLC, Palo Alto, CA (US)

(*) Notice: Subject to any disclaimer, the term of this patent is extended or adjusted under 35 U.S.C. 154(b) by 0 days.

(21) Appl. No.: 17/171,744

(22) Filed: Feb. 9, 2021

(65) Prior Publication Data

US 2021/0165102 A1 Jun. 3, 2021

Related U.S. Application Data

(63) Continuation of application No. PCT/US2019/043488, filed on Jul. 25, 2019.

(Continued)

(51) Int. Cl.
*G01S 17/931* (2020.01)
*G01S 7/493* (2006.01)
(Continued)

(52) U.S. Cl.
CPC .......... *G01S 17/931* (2020.01); *B60W 10/18* (2013.01); *B60W 10/20* (2013.01); *B60W 30/09* (2013.01);
(Continued)

(58) Field of Classification Search
CPC .... G01S 17/931; G01S 17/849; G01S 7/4814; G01S 7/4816; G01S 7/4817;
(Continued)

(56) References Cited

U.S. PATENT DOCUMENTS 6,064,419 A 5/2000 Uchiyama
7,969,558 B2 6/2011 Hall
(Continued)

FOREIGN PATENT DOCUMENTS

WO WO-2018/102188 A1 6/2018
WO WO-2018/107237 A1 6/2018
(Continued)

OTHER PUBLICATIONS

"Block diagram," Wikipedia, downloaded Apr. 7, 2020 from https://en.wikipedia.org/wiki/Block_diagram, 3 pages. (Year: 2020).
(Continued)

*Primary Examiner* — Luke D Ratcliffe
(74) *Attorney, Agent, or Firm* — Foley & Lardner LLP

(57) ABSTRACT

An autonomous vehicle includes a LIDAR system that includes a waveguide array, a collimator configured to receive a plurality of beams from the waveguide array and output a plurality of collimated beams, and a scanner configured to adjust a direction of the plurality of collimated beams. The vehicle also includes one or more processors configured to determine a range to an object based on a return signal received from reflection or scattering of the plurality of collimated beams by the object and to control operation of at least one of a steering system or the braking system based on the range.

19 Claims, 20 Drawing Sheets

Related U.S. Application Data

(60) Provisional application No. 62/717,200, filed on Aug. 10, 2018.

(51) Int. Cl.

| | | |
|---|---|---|
| *G01S 17/32* | (2020.01) | |
| *G01S 17/58* | (2006.01) | |
| *G01S 17/89* | (2020.01) | |
| *G01S 17/894* | (2020.01) | |
| *B60W 60/00* | (2020.01) | |
| *B60W 10/18* | (2012.01) | |
| *B60W 10/20* | (2006.01) | |
| *B60W 30/09* | (2012.01) | |
| *B60W 30/095* | (2012.01) | |
| *G01S 7/481* | (2006.01) | |
| *G02B 6/26* | (2006.01) | |
| *G02B 26/10* | (2006.01) | |
| *G02B 26/12* | (2006.01) | |

(52) U.S. Cl.
CPC ....... *B60W 30/0956* (2013.01); *B60W 60/001* (2020.02); *G01S 7/4814* (2013.01); *G01S 7/4816* (2013.01); *G01S 7/4817* (2013.01); *G01S 7/493* (2013.01); *G01S 17/32* (2013.01); *G01S 17/58* (2013.01); *G01S 17/89* (2013.01); *G01S 17/894* (2020.01); *G02B 6/262* (2013.01); *G02B 26/101* (2013.01); *G02B 26/123* (2013.01); *B60W 2420/52* (2013.01); *B60W 2554/404* (2020.02)

(58) Field of Classification Search
CPC ........ G01S 17/894; G01S 7/493; G01S 17/32; G01S 17/58; G01S 17/89; B60W 60/001; B60W 10/18; G02B 6/262; G02B 26/101; G02B 26/123; G60W 60/001
See application file for complete search history.

(56) References Cited

U.S. PATENT DOCUMENTS

| | | |
|---|---|---|
| 9,348,137 B2 | 5/2016 | Plotkin et al. |
| 9,575,341 B2 | 2/2017 | Heck et al. |
| 9,804,264 B2 | 10/2017 | Villeneuve et al. |
| 10,303,044 B2 | 5/2019 | Morarity et al. |
| 2006/0132752 A1* | 6/2006 | Kane ................. G01S 17/42 356/5.02 |
| 2018/0003805 A1 | 1/2018 | Popovich et al. |
| 2018/0059221 A1 | 3/2018 | Slobodyanyuk et al. |
| 2018/0107237 A1 | 4/2018 | Andregg et al. |
| 2018/0299534 A1* | 10/2018 | LaChapelle ............ H04N 5/232 |
| 2019/0107607 A1 | 4/2019 | Danziger |
| 2019/0257927 A1* | 8/2019 | Yao ..................... G01S 7/4817 |
| 2019/0369251 A1* | 12/2019 | Feng .................... G01S 7/4817 |

FOREIGN PATENT DOCUMENTS

| | | |
|---|---|---|
| WO | WO-2018/125438 A2 | 7/2018 |
| WO | WO-2018/144853 A1 | 8/2018 |
| WO | WO-2018/160240 A2 | 9/2018 |
| WO | WO-2019/014177 A1 | 1/2019 |
| WO | WO-2020/033161 | 2/2020 |

OTHER PUBLICATIONS

International Search Report and Written Opinion on PCT/US2019/043488, dated Dec. 2, 2019, 19 pages.
Kachelmyer, "Range-Doppler Imaging with a Laser Radar," The Lincoln Laboratory Journal, 1990, vol. 3, No. 1, pp. 87-118.
Foreign Action other than Search Report on PCT PCT/US2019/043488 dated Feb. 25, 2021.
Notice of Third Party Observation for PCT/US2019/043488 dated Jul. 3, 2020; 4pgs.

* cited by examiner

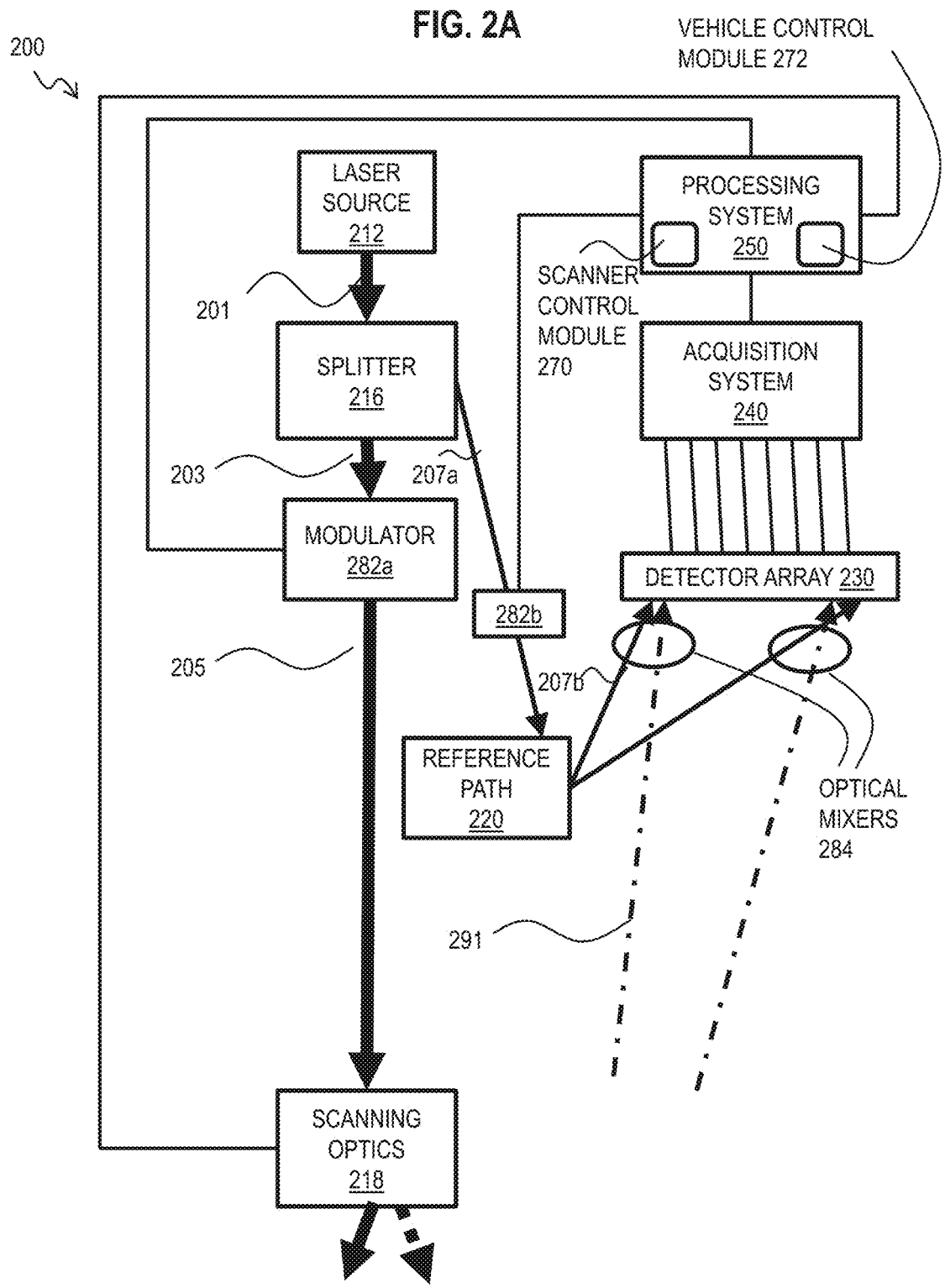

Example of MMI Switch

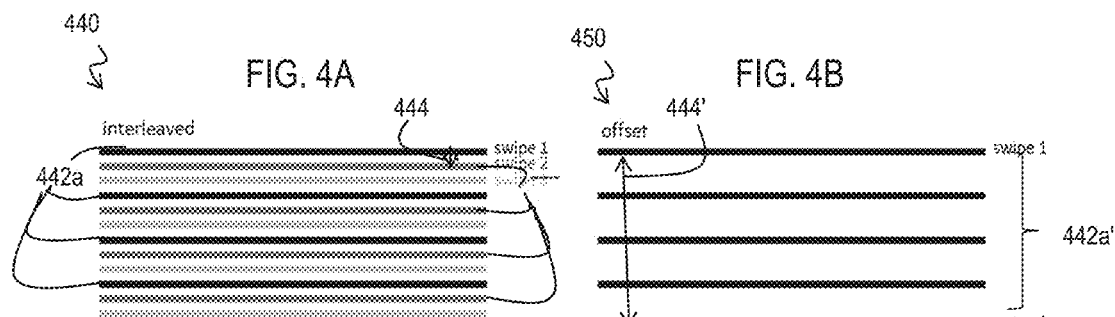
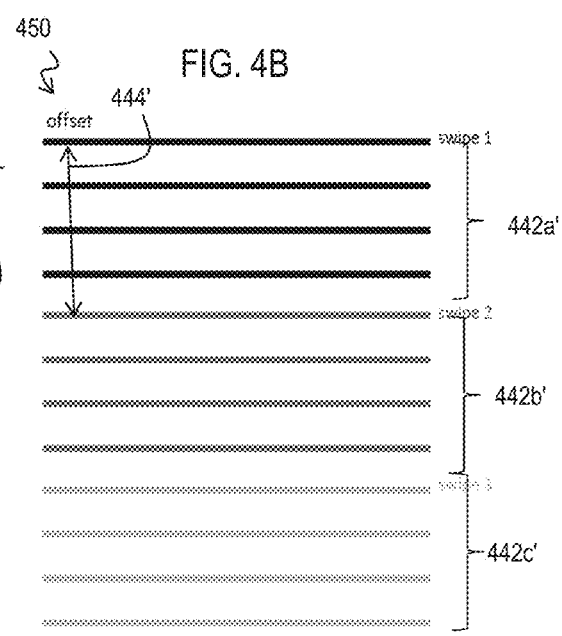
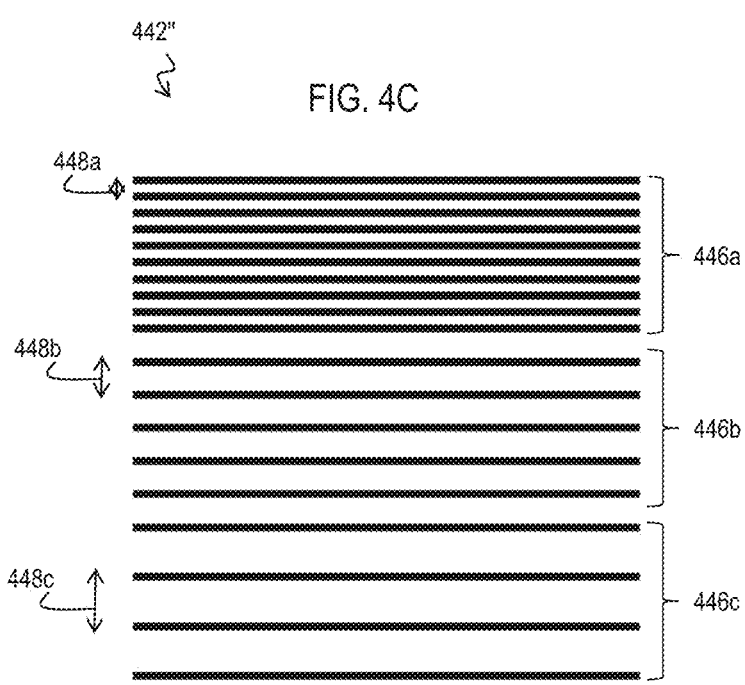

Backscan

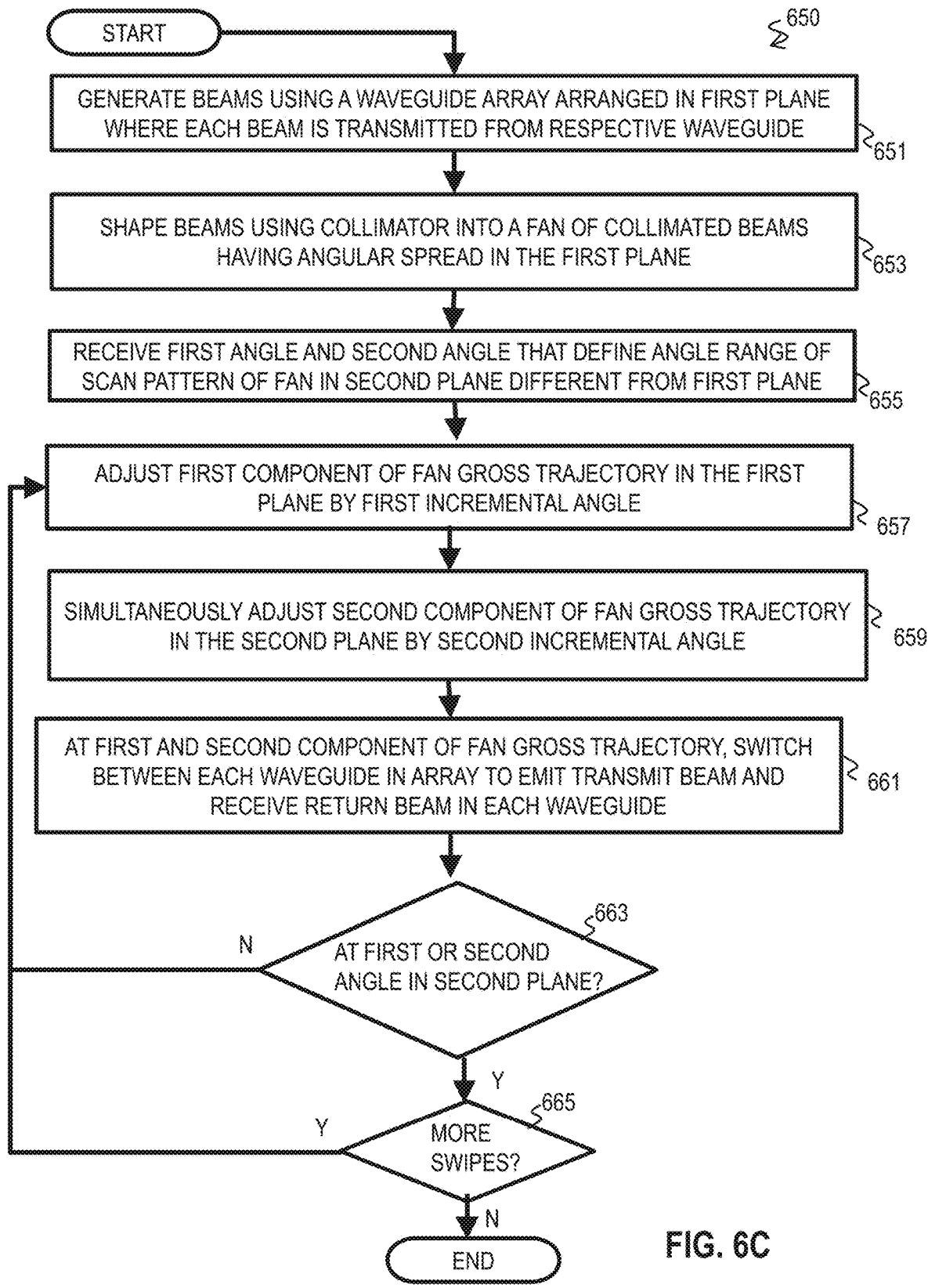

AUTONOMOUS VEHICLE LIDAR SYSTEM USING A WAVEGUIDE ARRAY

CROSS-REFERENCE TO RELATED APPLICATIONS

This application is a continuation of International Application No. PCT/US2019/043488, filed Jul. 25, 2019, which claims the benefit of and priority to U.S. Patent Application No. 62/717,200, filed Aug. 10, 2018. The entire disclosures of International Application No. PCT/US2019/043488 and U.S. Patent Application No. 62/717,200 are hereby incorporated by reference as if fully set forth herein.

BACKGROUND

Optical detection of range using lasers, often referenced by a mnemonic, LIDAR, for light detection and ranging, also sometimes called laser RADAR (radio-wave detection and ranging), is used for a variety of applications, from altimetry, to imaging, to collision avoidance. LIDAR provides finer scale range resolution with smaller beam sizes than conventional microwave ranging systems, such as RADAR. Optical detection of range can be accomplished with several different techniques, including direct ranging based on round trip travel time of an optical pulse to an object, and chirped detection based on a frequency difference between a transmitted chirped optical signal and a returned signal scattered from an object, and phase-encoded detection based on a sequence of single frequency phase changes that are distinguishable from natural signals.

To achieve acceptable range accuracy and detection sensitivity, direct long range LIDAR systems use short pulse lasers with low pulse repetition rate and extremely high pulse peak power. The high pulse power can lead to rapid degradation of optical components. Chirped and phase-encoded LIDAR systems use long optical pulses with relatively low peak optical power. In this configuration, the range accuracy increases with the chirp bandwidth or length and bandwidth of the phase codes rather than the pulse duration, and therefore excellent range accuracy can still be obtained.

Useful optical bandwidths have been achieved using wideband radio frequency (RF) electrical signals to modulate an optical carrier. Recent advances in LIDAR include using the same modulated optical carrier as a reference signal that is combined with the returned signal at an optical detector to produce in the resulting electrical signal a relatively low beat frequency in the RF band that is proportional to the difference in frequencies or phases between the references and returned optical signals. This kind of beat frequency detection of frequency differences at a detector is called heterodyne detection. It has several advantages known in the art, such as the advantage of using RF components of ready and inexpensive availability.

Recent work by current inventors, show a novel arrangement of optical components and coherent processing to detect Doppler shifts in returned signals that provide not only improved range but also relative signed speed on a vector between the LIDAR system and each external object. These systems are called hi-res range-Doppler LIDAR herein. See for example World Intellectual Property Organization (WIPO) publications WO 2018/160240 and WO 2018/144853.

These improvements provide range, with or without target speed, in a pencil thin laser beam of proper frequency or phase content. When such beams are swept over a scene, information about the location and speed of surrounding objects can be obtained. This information is expected to be of value in control systems for autonomous vehicles, such as self-driving, or driver-assisted, automobiles.

SUMMARY

Conventional LIDAR systems include collimators that are used to produce multiple beams from one source beam. However, collimators in conventional LIDAR systems have notable drawbacks. The inventors recognized that these collimators typically satisfy one or more design parameters of conventional LIDAR systems but frequently fail to satisfy other design parameters of the system. For example, large beam collimators can produce a desired beam size but cannot be packed close enough to achieve a desired angular spacing. In another example, array collimators can produce beams that are sufficiently close together but do not provide a large enough beam size for the LIDAR system. Here is described a collimator which overcomes these noted drawbacks. Additionally, this collimator is used in various scanning apparatuses and methods to achieve an improved scanning LIDAR. For example, a scanning apparatus employs a polygon scanner that rotates at a fixed speed in conjunction with the collimator to achieve a more efficient scanning than conventional scanning techniques.

The sampling and processing that provides range accuracy and target speed accuracy involve integration of one or more laser signals of various durations, in a time interval called integration time. To cover a scene in a timely way involves repeating a measurement of sufficient accuracy (involving one or more signals often over one to tens of microseconds) often enough to sample a variety of angles (often on the order of thousands) around the autonomous vehicle to understand the environment around the vehicle before the vehicle advances too far into the space ahead of the vehicle (a distance on the order of one to tens of meters, often covered in a particular time on the order of one to a few seconds). The number of different angles that can be covered in the particular time (often called the cycle or sampling time) depends on the sampling rate. The current inventors have recognized that a tradeoff can be made between integration time for range and speed accuracy, sampling rate, and pattern of sampling different angles, with one or more LIDAR beams, to effectively determine the environment in the vicinity of an autonomous vehicle as the vehicle moves through that environment.

In a first set of embodiments, an assembly apparatus for a LIDAR system includes a waveguide array arranged in a first plane. The waveguide array is configured to generate a plurality of beams where each beam is transmitted from a respective waveguide in the array. The apparatus also includes a collimator configured to shape the plurality of beams into a fan of collimated beams having an angular spread in the first plane. Additionally, the apparatus includes a polygon scanner configured to adjust a direction of the fan in a second plane that is different than the first plane.

In a second set of embodiments, a system is provided that includes the assembly above and further includes a processor, a memory and a sequence of instructions that are configured to cause the system to receive a first angle and a second angle in the second plane that define an angle range of a scan pattern of the fan and to adjust the direction of the fan in the second plane using the polygon scanner from the first angle to the second angle; and to receive a plurality of return beams encompassing the angular spread of a target at a range.

In a third set of embodiments, a method is provided that includes generating a plurality of beams with a waveguide array of a LIDAR system arranged in a first plane, where each beam is transmitted from a respective waveguide in the array. The method further includes shaping the plurality of beams with a collimator into a fan of collimated beams having an angular spread in the first plane. The method further includes receiving, on a processor, a first angle and a second angle in a second plane different than the first plane, where the first angle and the second angle defines an angle range of a scan pattern of the fan in the second plane. The method further includes adjusting a direction of the fan in the second plane with a polygon scanner from the first angle to the second angle to form the scan pattern. The method further includes receiving, at the waveguide in the array, a return beam from a target located at a range.

In a fourth set of embodiments, a method is provided that includes generating a plurality of beams with a waveguide array of a LIDAR system arranged in a first plane, where each beam is transmitted from a respective waveguide in the array. The method further includes shaping the plurality of beams with a collimator into a fan of collimated beams having an angular spread in the first plane. The method further includes receiving, on a processor, a first angle and a second angle in a second plane different than the first plane, where the first angle and the second angle defines an angle range of a scan pattern of the fan in the second plane. The method further includes adjusting, with a scanner, a first component of a gross trajectory of the fan in two dimensional space defined by the first and second plane, where the first component is a first incremental angle in the first plane. The method further includes adjusting, with the scanner, a second component of the gross trajectory of the fan, where the second component is a second incremental angle in the second plane. The method further includes switching between each waveguide in the array for each component of the gross trajectory, to emit a transmit beam from the waveguide and receive a return beam at the waveguide.

Still other aspects, features, and advantages are readily apparent from the following detailed description, simply by illustrating a number of particular embodiments and implementations, including the best mode contemplated for carrying out the invention. Other embodiments are also capable of other and different features and advantages, and their several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which:

FIG. 2A is a block diagram that illustrates example components of a high-resolution (hi res) LIDAR system, according to an embodiment;

FIG. 4A is an image that illustrates an example of multiple interleave swipes of the collimated fan beam using the system of FIG. 2G, according to an embodiment;

FIG. 4B is an image that illustrates an example of multiple offset swipes of the collimated fan beam using the system of FIG. 2G, according to an embodiment;

FIG. 4C is an image that illustrates an example of one swipe of the collimated fan beam using the system of FIG. 2G where the waveguides in the array are irregularly spaced, according to an embodiment;

FIG. 6C is a flow chart that illustrates an example method for operating a scanner of a LIDAR system, according to an embodiment;

DETAILED DESCRIPTION

Figure 1A:
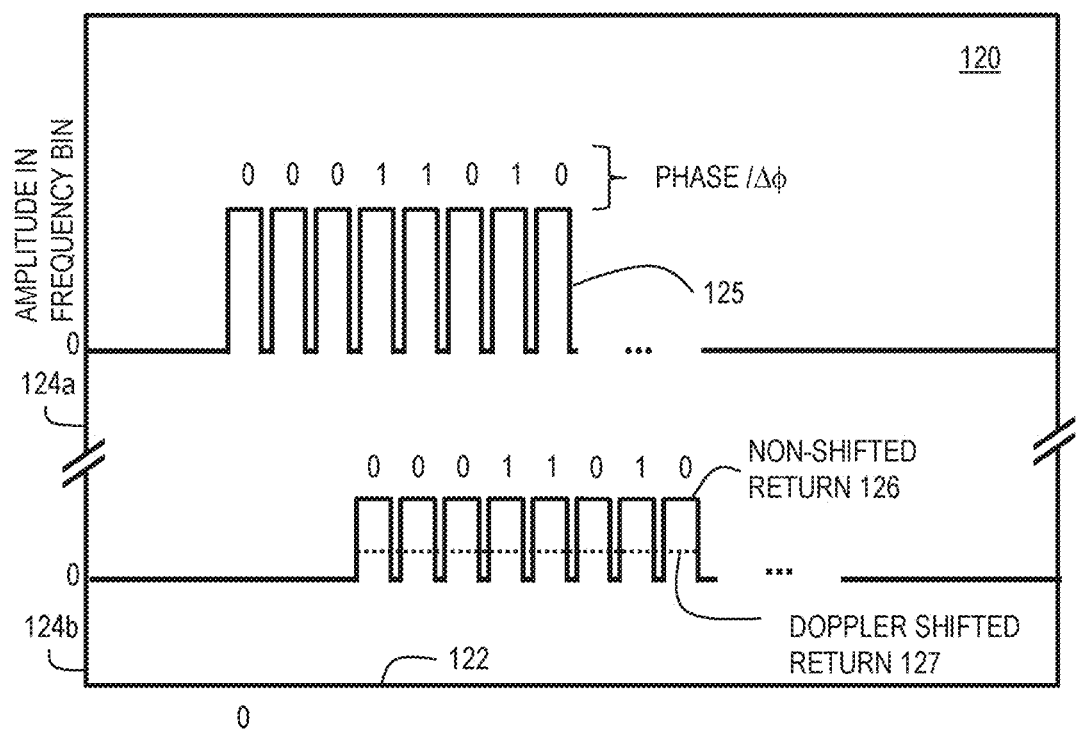
FIG. 1A is a schematic graph that illustrates the example transmitted signal of a series of binary digits along with returned optical signals for measurement of range, according to an embodiment.

A method and apparatus and system and computer-readable medium are described for scanning a fan of collimated beams of a LIDAR system. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5x to 2x, for example, about 100 implies a value in a range from 50 to 200. Moreover, all ranges disclosed herein are to be understood to encompass any and all sub-ranges subsumed therein. For example, a range of "less than 10" for a positive only parameter can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some embodiments of the invention are described below in the context of a LIDAR system that generates a collimated fan of beams that can be scanned across a scan pattern defined by a first angle and a second angle. In other embodiments, the invention is described in the context of a single front mounted hi-res Doppler LIDAR system on a personal automobile; but, embodiments are not limited to these contexts. In other embodiments, one or multiple systems of the same type or other high-resolution LIDAR, with or without Doppler components, with overlapping or non-overlapping fields of view or one or more such systems mounted on smaller or larger land, sea, air or space vehicles, piloted or autonomous, are employed. In still other embodiments, the invention is described in the context of static LIDAR, such as on a LIDAR system mounted on a tripod or positioned in a surveillance tower.

1. PHASE-ENCODED DETECTION OVERVIEW

Using an optical phase-encoded signal for measurement of range, the transmitted signal is in phase with a carrier (phase=0) for part of the transmitted signal and then changes by one or more phase changes represented by the symbol $\Delta\phi$ (so phase=0, $\Delta\phi$, $2\Delta\phi$ . . . ) for short time intervals, switching back and forth between the two or more phase values repeatedly over the transmitted signal. The shortest interval of constant phase is a parameter of the encoding called pulse duration $\tau$ and is typically the duration of several periods of the lowest frequency in the band. The reciprocal, $1/\tau$, is baud rate, where each baud indicates a symbol. The number N of such constant phase pulses during the time of the transmitted signal is the number N of symbols and represents the length of the encoding. In binary encoding, there are two phase values and the phase of the shortest interval can be considered a 0 for one value and a 1 for the other, thus the symbol is one bit, and the baud rate is also called the bit rate. In multiphase encoding, there are multiple phase values. For example, 4 phase values such as $\Delta\phi^*$ {0, 1, 2 and 3}, which, for $\Delta\phi=\pi/2$ (90 degrees), equals {0, $\pi/2$, $\pi$ and $3\pi/2$}, respectively; and, thus 4 phase values can represent 0, 1, 2, 3, respectively. In this example, each symbol is two bits and the bit rate is twice the baud rate.

Phase-shift keying (PSK) refers to a digital modulation scheme that conveys data by changing (modulating) the phase of a reference signal (the carrier wave). The modulation is impressed by varying the sine and cosine inputs at a precise time. At radio frequencies (RF), PSK is widely used for wireless local area networks (LANs), RF identification (RFID) and Bluetooth communication. Alternatively, instead of operating with respect to a constant reference wave, the transmission can operate with respect to itself. Changes in phase of a single transmitted waveform can be considered the symbol. In this system, the demodulator determines the changes in the phase of the received signal rather than the phase (relative to a reference wave) itself. Since this scheme depends on the difference between successive phases, it is termed differential phase-shift keying (DPSK). DPSK can be significantly simpler to implement in communications applications than ordinary PSK, since there is no need for the demodulator to have a copy of the reference signal to determine the exact phase of the received signal (thus, it is a non-coherent scheme).

For optical ranging applications, since the transmitter and receiver are in the same device, coherent PSK can be used. The carrier frequency is an optical frequency fc and a RF $f_0$ is modulated onto the optical carrier. The number N and duration $\tau$ of symbols are selected to achieve the desired range accuracy and resolution. The pattern of symbols is selected to be distinguishable from other sources of coded signals and noise. Thus a strong correlation between the transmitted and returned signal is a strong indication of a reflected or backscattered signal. The transmitted signal is made up of one or more blocks of symbols, where each block is sufficiently long to provide strong correlation with a reflected or backscattered return even in the presence of noise. In the following discussion, it is assumed that the transmitted signal is made up of M blocks of N symbols per block, where M and N are non-negative integers.

FIG. 1A is a schematic graph 120 that illustrates the example transmitted signal as a series of binary digits along with returned optical signals for measurement of range, according to an embodiment. The horizontal axis 122 indicates time in arbitrary units after a start time at zero. The vertical axis 124a indicates amplitude of an optical transmitted signal at frequency $fc+f_0$ in arbitrary units relative to zero. The vertical axis 124b indicates amplitude of an optical returned signal at frequency $fc+f_0$ in arbitrary units relative to zero; and, is offset from axis 124a to separate traces. Trace 125 represents a transmitted signal of M*N binary symbols, with phase changes as shown in FIG. 1A to produce a code starting with 00011010 and continuing as indicated by ellipsis. Trace 126 represents an idealized (noiseless) return signal that is scattered from an object that is not moving (and thus the return is not Doppler shifted). The amplitude is reduced, but the code 00011010 is recognizable. Trace 127 represents an idealized (noiseless) return signal that is scattered from an object that is moving and is therefore Doppler shifted. The return is not at the proper optical frequency $fc+f_0$ and is not well detected in the expected frequency band, so the amplitude is diminished.

The observed frequency f' of the return differs from the correct frequency $f=fc+f_0$ of the return by the Doppler effect given by Equation 1.

$$f' = \frac{(c+v_o)}{(c+v_s)} f \qquad (1)$$

Where c is the speed of light in the medium, $v_o$ is the velocity of the observer and $v_s$ is the velocity of the source along the vector connecting source to receiver. Note that the two frequencies are the same if the observer and source are moving at the same speed in the same direction on the vector between the two. The difference between the two frequencies, $\Delta f = f' - f$, is the Doppler shift, $\Delta f_D$, which causes problems for the range measurement, and is given by Equation 2.

$$\Delta f_D = \left[\frac{(c+v_o)}{(c+v_s)} - 1\right] f \qquad (2)$$

Note that the magnitude of the error increases with the frequency f of the signal. Note also that for a stationary LIDAR system ($v_o=0$), for an object moving at 10 meters a second ($v_s=10$), and visible light of frequency about 500 THz, then the size of the Doppler shift is on the order of 16 megahertz (MHz, 1 MHz=$10^6$ hertz, Hz, 1 Hz=1 cycle per second). In various embodiments described below, the Doppler shift is detected and used to process the data for the calculation of range.

In phase coded ranging, the arrival of the phase coded return is detected in the return signal by cross correlating the transmitted signal or other reference signal with the returned signal, implemented practically by cross correlating the code for a RF signal with a electrical signal from an optical detector using heterodyne detection and thus down-mixing back to the RF band. Cross correlation for any one lag is computed by convolving the two traces, i.e., multiplying corresponding values in the two traces and summing over all points in the trace, and then repeating for each time lag. Alternatively, the cross correlation can be accomplished by a multiplication of the Fourier transforms of each of the two traces followed by an inverse Fourier transform. Efficient hardware and software implementations for a Fast Fourier transform (FFT) are widely available for both forward and inverse Fourier transforms.

Note that the cross-correlation computation is typically done with analog or digital electrical signals after the amplitude and phase of the return is detected at an optical detector. To move the signal at the optical detector to a RF frequency range that can be digitized easily, the optical return signal is optically mixed with the reference signal before impinging on the detector. A copy of the phase-encoded transmitted optical signal can be used as the reference signal, but it is also possible, and often preferable, to use the continuous wave carrier frequency optical signal output by the laser as the reference signal and capture both the amplitude and phase of the electrical signal output by the detector.

For an idealized (noiseless) return signal that is reflected from an object that is not moving (and thus the return is not Doppler shifted), a peak occurs at a time $\Delta t$ after the start of the transmitted signal. This indicates that the returned signal includes a version of the transmitted phase code beginning at the time $\Delta t$. The range R to the reflecting (or backscattering) object is computed from the two way travel time delay based on the speed of light c in the medium, as given by Equation 3.

$$R=c*\Delta t/2 \qquad (3)$$

For an idealized (noiseless) return signal that is scattered from an object that is moving (and thus the return is Doppler shifted), the return signal does not include the phase encoding in the proper frequency bin, the correlation stays low for all time lags, and a peak is not as readily detected, and is often undetectable in the presence of noise. Thus $\Delta t$ is not as readily determined; and, range R is not as readily produced.

Figure 1B:
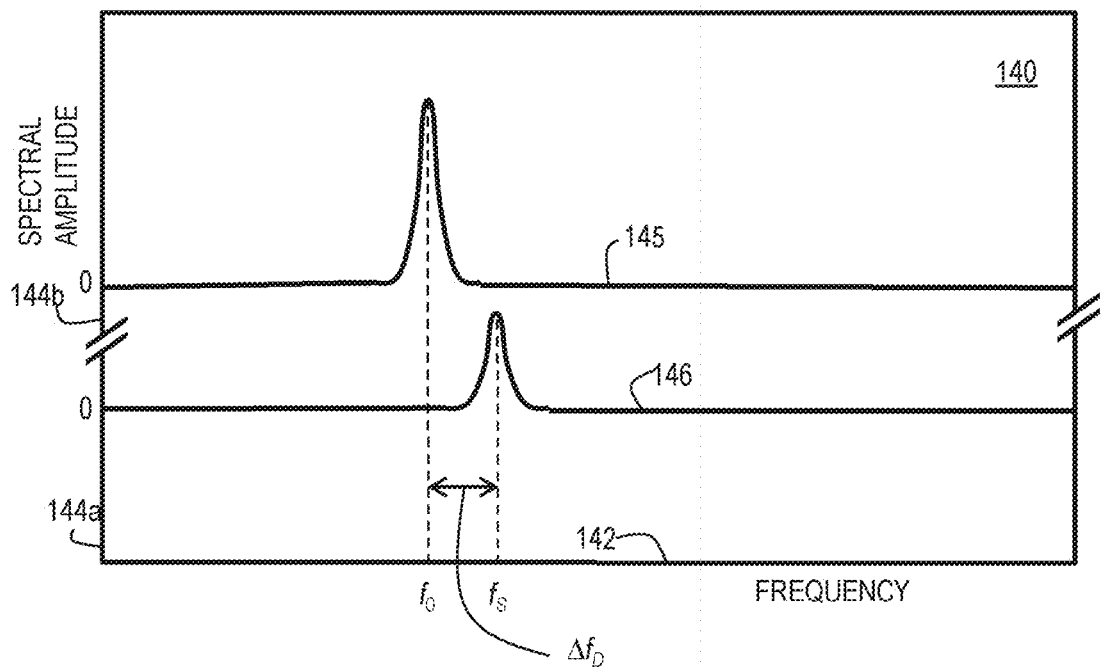
FIG. 1B is a schematic graph that illustrates an example spectrum of the reference signal and an example spectrum of a Doppler shifted return signal, according to an embodiment.

According to various embodiments of the inventor's previous work, the Doppler shift is determined in the electrical processing of the returned signal; and the Doppler shift is used to correct the cross-correlation calculation. Thus, a peak is more readily found and range can be more readily determined. FIG. 1B is a schematic graph 140 that illustrates an example spectrum of the transmitted signal and an example spectrum of a Doppler shifted complex return signal, according to an embodiment. The horizontal axis 142 indicates RF frequency offset from an optical carrier fc in arbitrary units. The vertical axis 144a indicates amplitude of a particular narrow frequency bin, also called spectral density, in arbitrary units relative to zero. The vertical axis 144b indicates spectral density in arbitrary units relative to zero; and, is offset from axis 144a to separate traces. Trace 145 represents a transmitted signal; and, a peak occurs at the proper RF $f_0$. Trace 146 represents an idealized (noiseless) complex return signal that is backscattered from an object that is moving toward the LIDAR system and is therefore Doppler shifted to a higher frequency (called blue shifted). The return does not have a peak at the proper RF, $f_0$; but, instead, is blue shifted by $\Delta f_D$ to a shifted frequency $f_S$. In practice, a complex return representing both in-phase and quadrature (I/Q) components of the return is used to determine the peak at $+\Delta f_D$, thus the direction of the Doppler shift, and the direction of motion of the target on the vector between the sensor and the object, is apparent from a single return.

Figure 1C:
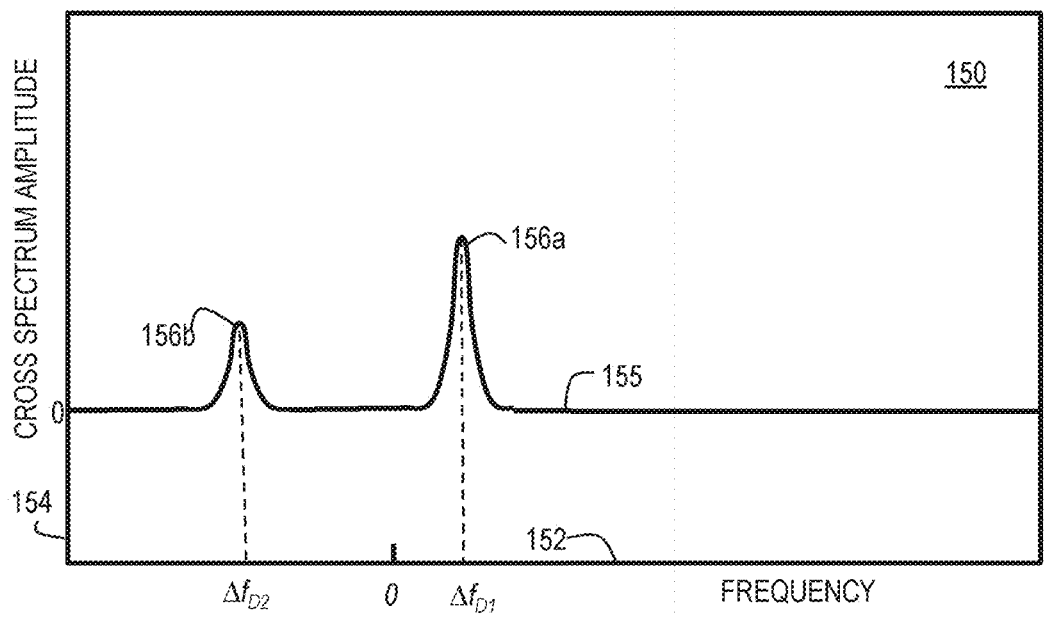
FIG. 1C is a schematic graph that illustrates an example cross-spectrum of phase components of a Doppler shifted return signal, according to an embodiment.

In some Doppler compensation embodiments, rather than finding $\Delta f_D$ by taking the spectrum of both transmitted and returned signals and searching for peaks in each, then subtracting the frequencies of corresponding peaks, as illustrated in FIG. 1B, it is more efficient to take the cross spectrum of the in-phase and quadrature component of the down-mixed returned signal in the RF band. FIG. 1C is a schematic graph 150 that illustrates an example cross-spectrum, according to an embodiment. The horizontal axis 152 indicates frequency shift in arbitrary units relative to the reference spectrum; and, the vertical axis 154 indicates amplitude of the cross spectrum in arbitrary units relative to zero. Trace 155 represents a cross spectrum with an idealized (noiseless) return signal generated by one object moving toward the LIDAR system (blue shift of $\Delta f_{D1}=\Delta f_D$ in FIG. 1B) and a second object moving away from the LIDAR system (red shift of $\Delta f_{D2}$). A peak occurs when one of the components is blue shifted $\Delta f_{D1}$; and, another peak occurs when one of the components is red shifted $\Delta f_{D2}$. Thus the Doppler shifts are determined. These shifts can be used to determine a signed velocity of approach of objects in the vicinity of the LIDAR, as can be critical for collision avoidance applications. However, if I/Q processing is not done, peaks appear at both $+/-\Delta f_{D1}$ and both $+/-\Delta f_{D2}$, so there is ambiguity on the sign of the Doppler shift and thus the direction of movement.

As described in more detail in inventor's previous work the Doppler shift(s) detected in the cross spectrum are used to correct the cross correlation so that the peak 135 is apparent in the Doppler compensated Doppler shifted return at lag $\Delta t$, and range R can be determined. In some embodiments simultaneous I/Q processing is performed as described in more detail in World Intellectual Property Organization publication WO 2018/144853 entitled "Method and system for Doppler detection and Doppler correction of optical phase-encoded range detection", the entire contents of which are hereby incorporated by reference as if fully set forth herein. In other embodiments, serial I/Q processing is used to determine the sign of the Doppler return as described in more detail in World Intellectual Property Organization publication WO 2019/014177 entitled "Method and System for Time Separated Quadrature Detection of Doppler Effects in Optical Range Measurements", the entire contents of which are hereby incorporated by reference as if fully set forth herein. In other embodiments, other means are used to determine the Doppler correction; and, in various embodiments, any method known in the art to perform Doppler correction is used. In some embodiments, errors due to Doppler shifting are tolerated or ignored; and, no Doppler correction is applied to the range measurements.

2. CHIRPED DETECTION OVERVIEW

Figure 1D:
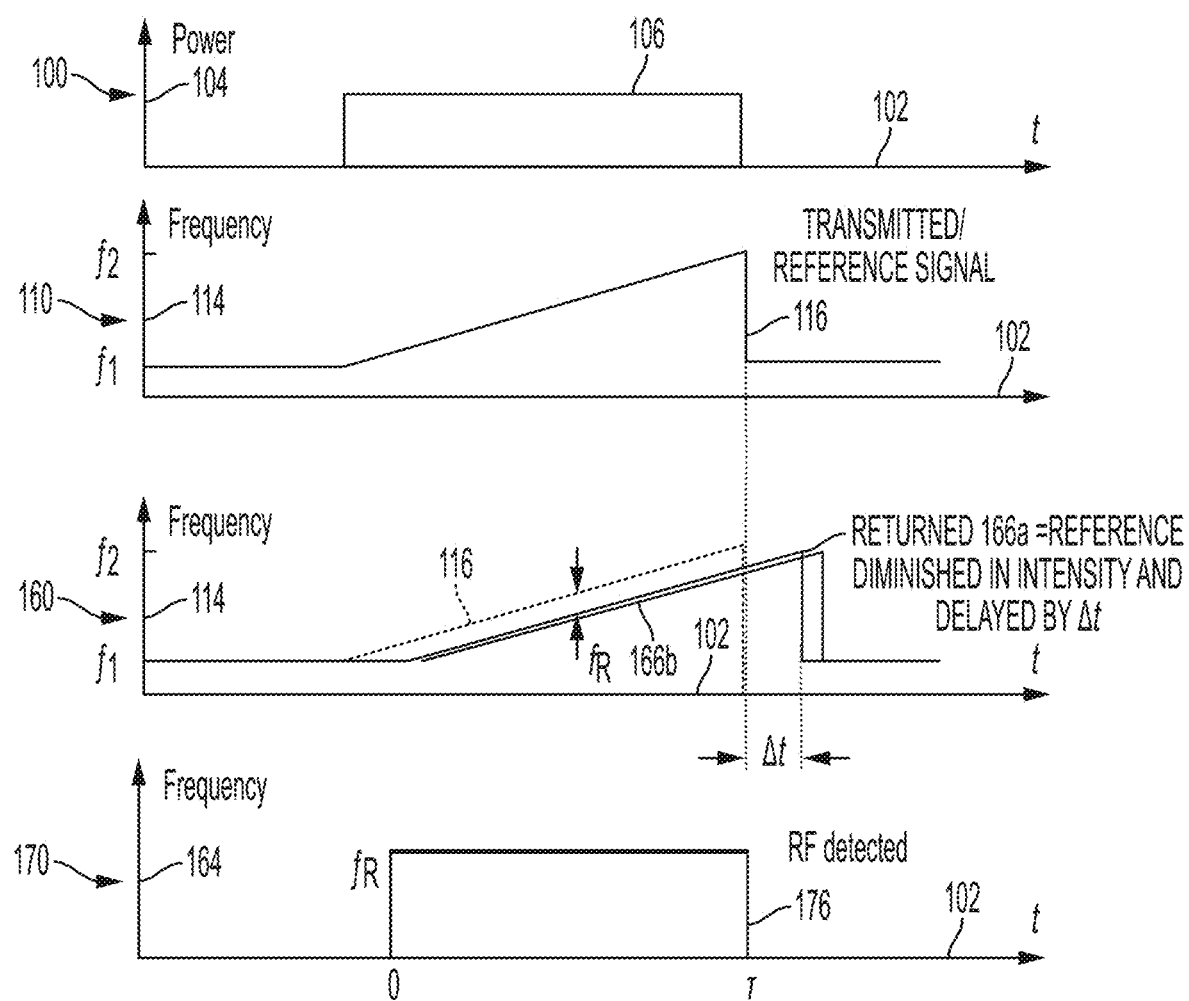
FIG. 1D is a set of graphs that illustrates an example optical chirp measurement of range, according to an embodiment.

FIG. 1D is a set of graphs that illustrates an example optical chirp measurement of range, according to an embodiment. The horizontal axis 102 is the same for all four graphs and indicates time in arbitrary units, on the order of milliseconds (ms, 1 ms=$10^{-3}$ seconds). Graph 100 indicates the power of a beam of light used as a transmitted optical signal. The vertical axis 104 in graph 100 indicates power of the transmitted signal in arbitrary units. Trace 106 indicates that the power is on for a limited pulse duration, $\tau$ starting at time 0. Graph 110 indicates the frequency of the transmitted signal. The vertical axis 114 indicates the frequency transmitted in arbitrary units. The trace 116 indicates that the frequency of the pulse increases from $f_1$ to $f_2$ over the duration $\tau$ of the pulse, and thus has a bandwidth $B=f_2-f_1$. The frequency rate of change is $(f_2-f_1)/\tau$.

The returned signal is depicted in graph 160 which has a horizontal axis 102 that indicates time and a vertical axis 114 that indicates frequency as in graph 110. The chirp 116 of graph 110 is also plotted as a dotted line on graph 160. A first returned signal is given by trace 166a, which is just the transmitted reference signal diminished in intensity (not shown) and delayed by $\Delta t$. When the returned signal is received from an external object after covering a distance of 2R, where R is the range to the target, the returned signal start at the delayed time $\Delta t$ is given by 2R/c, where c is the speed of light in the medium (approximately $3\times10^8$ meters per second, m/s), related according to Equation 3, described above. Over this time, the frequency has changed by an amount that depends on the range, called $f_R$, and given by the frequency rate of change multiplied by the delay time. This is given by Equation 4a.

$$f_R=(f_2-f_1)/\tau*2R/c=2BR/c\tau \qquad (4a)$$

The value of $f_R$ is measured by the frequency difference between the transmitted signal 116 and returned signal 166a in a time domain mixing operation referred to as de-chirping. So the range R is given by Equation 4b.

$$R=f_R c\tau/2B \qquad (4b)$$

Of course, if the returned signal arrives after the pulse is completely transmitted, that is, if 2R/c is greater than $\tau$, then Equations 4a and 4b are not valid. In this case, the reference signal is delayed a known or fixed amount to ensure the returned signal overlaps the reference signal. The fixed or known delay time of the reference signal is multiplied by the speed of light, c, to give an additional range that is added to range computed from Equation 4b. While the absolute range may be off due to uncertainty of the speed of light in the medium, this is a near-constant error and the relative ranges based on the frequency difference are still very precise.

In some circumstances, a spot (pencil beam cross section) illuminated by the transmitted light beam encounters two or more different scatterers at different ranges, such as a front and a back of a semitransparent object, or the closer and farther portions of an object at varying distances from the LIDAR, or two separate objects within the illuminated spot. In such circumstances, a second diminished intensity and differently delayed signal will also be received, indicated on graph 160 by trace 166b. This will have a different measured value of $f_R$ that gives a different range using Equation 4b. In some circumstances, multiple additional returned signals are received.

Graph 170 depicts the difference frequency $f_R$ between a first returned signal 166a and the reference chirp 116. The horizontal axis 102 indicates time as in all the other aligned graphs in FIG. 1D, and the vertical axis 164 indicates frequency difference on a much-expanded scale. Trace 176 depicts the constant frequency $f_R$ measured in response to the transmitted chirp, which indicates a particular range as given by Equation 4b. The second returned signal 166b, if present, would give rise to a different, larger value of $f_R$ (not shown) during de-chirping; and, as a consequence yield a larger range using Equation 4b.

A common method for de-chirping is to direct both the reference optical signal and the returned optical signal to the same optical detector. The electrical output of the detector is dominated by a beat frequency that is equal to, or otherwise depends on, the difference in the frequencies of the two signals converging on the detector. A Fourier transform of this electrical output signal will yield a peak at the beat frequency. This beat frequency is in the radio frequency (RF) range of Megahertz (MHz, 1 MHz=$10^6$ Hertz=$10^6$ cycles per second) rather than in the optical frequency range of Terahertz (THz, 1 THz=$10^{12}$ Hertz). Such signals are readily processed by common and inexpensive RF components, such as a Fast Fourier Transform (FFT) algorithm running on a microprocessor or a specially built FFT or other digital signal processing (DSP) integrated circuit. In other embodiments, the return signal is mixed with a continuous wave (CW) tone acting as the local oscillator (versus a chirp as the local oscillator). This leads to the detected signal which itself is a chirp (or whatever waveform was transmitted). In this case the detected signal would undergo matched filtering in the digital domain as described in Kachelmyer 1990, the entire contents of which are hereby incorporated by reference as if fully set forth herein, except for terminology inconsistent with that used herein. The disadvantage is that the digitizer bandwidth requirement is generally higher. The positive aspects of coherent detection are otherwise retained.

In some embodiments, the LIDAR system is changed to produce simultaneous up and down chirps. This approach eliminates variability introduced by object speed differences, or LIDAR position changes relative to the object which actually does change the range, or transient scatterers in the beam, among others, or some combination. The approach then guarantees that the Doppler shifts and ranges measured on the up and down chirps are indeed identical and can be most usefully combined. The Doppler scheme guarantees parallel capture of asymmetrically shifted return pairs in frequency space for a high probability of correct compensation.

Figure 1E:
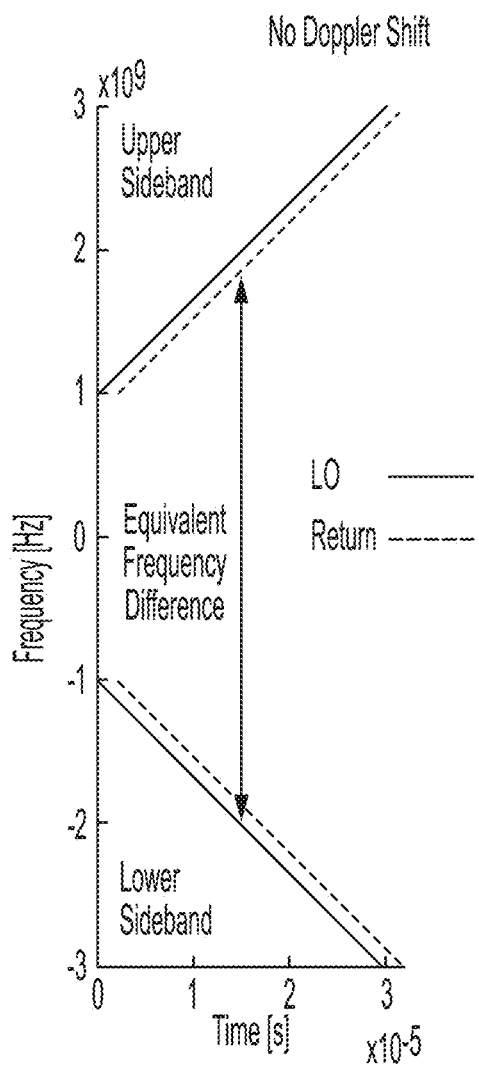
FIG. 1E is a graph using a symmetric LO signal, and shows the return signal in this frequency time plot as a dashed line when there is no Doppler shift, according to an embodiment.

FIG. 1E is a graph using a symmetric LO signal; and, shows the return signal in this frequency time plot as a dashed line when there is no Doppler shift, according to an embodiment. The horizontal axis indicates time in example units of $10^{-5}$ seconds (tens of microseconds). The vertical axis indicates frequency of the optical transmitted signal relative to the carrier frequency $f_c$ or reference signal in example units of gigaHertz (GHz, 1 GHz=$10^9$ Hertz). During a pulse duration, a light beam comprising two optical frequencies at any time is generated. One frequency increases from $f_1$ to $f_2$ (e.g., 1 to 2 GHz above the optical carrier) while the other frequency simultaneously decreases from $f_4$ to $f_3$ (e.g., 1 to 2 GHz below the optical carrier) The two frequency bands e.g., band 1 from $f_1$ to $f_2$, and band 2 from $f_3$ to $f_4$) do not overlap so that both transmitted and return signals can be optically separated by a high pass or a low pass filter, or some combination, with pass bands starting at pass frequency $f_p$. For example $f_1 < f_2 < f_p < f_3 < f_4$. Though, in the illustrated embodiment, the higher frequencies provide the up chirp and the lower frequencies provide the down chirp, in other embodiments, the higher frequencies produce the down chirp and the lower frequencies produce the up chirp.

In some embodiments, two different laser sources are used to produce the two different optical frequencies in each beam at each time. However, in some embodiments, a single optical carrier is modulated by a single RF chirp to produce symmetrical sidebands that serve as the simultaneous up and down chirps. In some of these embodiments, a double sideband Mach-Zehnder intensity modulator is used that, in general, does not leave much energy in the carrier frequency; instead, almost all of the energy goes into the sidebands.

As a result of sideband symmetry, the bandwidth of the two optical chirps will be the same if the same order sideband is used. In other embodiments, other sidebands are used, e.g., two second order sideband are used, or a first order sideband and a non-overlapping second sideband is used, or some other combination.

As described in World Intellectual Property Organization publication WO 2018/160240, entitled "Method and System for Doppler Detection and Doppler Correction of Optical Chirped Range Detection," the entire contents of which are hereby incorporated by reference as if fully set forth herein, when selecting the transmit (TX) and local oscillator (LO) chirp waveforms, it is advantageous to ensure that the frequency shifted bands of the system take maximum advantage of available digitizer bandwidth. In general, this is accomplished by shifting either the up chirp or the down chirp to have a range frequency beat close to zero.

Figure 1F:
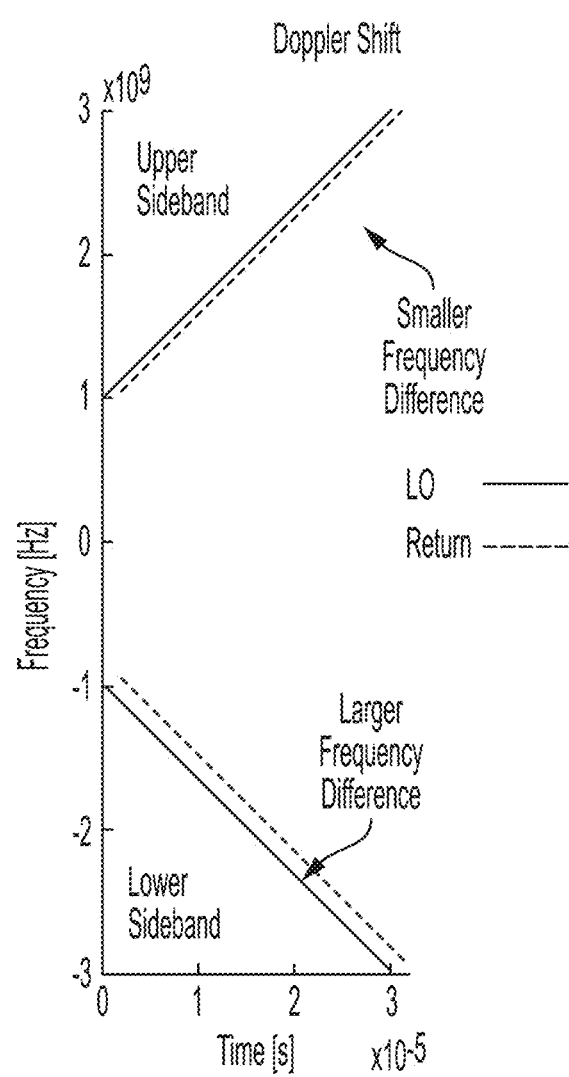
FIG. 1F is a graph similar to FIG. 1E, using a symmetric LO signal, and shows the return signal in this frequency time plot as a dashed line when there is a non-zero Doppler shift, according to an embodiment.

FIG. 1F is a graph similar to FIG. 1E, using a symmetric LO signal, and shows the return signal in this frequency time plot as a dashed line when there is a non-zero Doppler shift. For example, if the blue shift causing range effects is $f_B$, then the beat frequency of the up chirp will be increased by the offset and occur at $f_B+\Delta f_S$ and the beat frequency of the down chirp will be decreased by the offset to $f_B-\Delta f_S$. Thus, the up chirps will be in a higher frequency band than the down chirps, thereby separating them. If $\Delta f_S$ is greater than any expected Doppler effect, there will be no ambiguity in the ranges associated with up chirps and down chirps. The measured beats can then be corrected with the correctly signed value of the known $\Delta f_S$ to get the proper up-chirp and down-chirp ranges. In the case of a chirped waveform, the time separated I/Q processing (aka time domain multiplexing) can be used to overcome hardware requirements of other approaches as described above. In that case, an AOM is used to break the range-Doppler ambiguity for real valued signals. In some embodiments, a scoring system is used to pair the up and down chirp returns as described in more detail in the above cited publication. In other embodiments, I/Q processing is used to determine the sign of the Doppler chirp as described in more detail above.

3. OPTICAL DETECTION HARDWARE OVERVIEW

In order to depict how to use hi-res range-Doppler detection systems, some generic hardware approaches are described. FIG. 2A is a block diagram that illustrates example components of a high resolution range LIDAR system 200, according to an embodiment. Optical signals are indicated by arrows. Electronic wired or wireless connections are indicated by segmented lines without arrowheads. A laser source 212 emits a carrier wave 201 that is phase or frequency modulated in modulator 282a, before or after splitter 216, to produce a phase coded or chirped optical signal 203 that has a duration D. A splitter 216 splits the modulated (or, as shown, the unmodulated) optical signal for use in a reference path 220. A target beam 205, also called transmitted signal herein, with most of the energy of the beam 201 is produced. A modulated or unmodulated reference beam 207a with a much smaller amount of energy that is nonetheless enough to produce good mixing with the returned light 291 scattered from an object (not shown) is also produced. In the illustrated embodiment, the reference beam 207a is separately modulated in modulator 282b. The reference beam 207a passes through reference path 220 and is directed to one or more detectors as reference beam 207b. In some embodiments, the reference path 220 introduces a known delay sufficient for reference beam 207b to arrive at the detector array 230 with the scattered light from an object outside the LIDAR within a spread of ranges of interest. In some embodiments, the reference beam 207b is called the local oscillator (LO) signal referring to older approaches that produced the reference beam 207b locally from a separate oscillator. In various embodiments, from less to more flexible approaches, the reference is caused to arrive with the scattered or reflected field by: 1) putting a mirror in the scene to reflect a portion of the transmit beam back at the detector array so that path lengths are well matched; 2) using a fiber delay to closely match the path length and broadcast the reference beam with optics near the detector array, as suggested in FIG. 2A, with or without a path length adjustment to compensate for the phase or frequency difference observed or expected for a particular range; or, 3) using a frequency shifting device (acousto-optic modulator) or time delay of a local oscillator waveform modulation (e.g., in modulator 282b) to produce a separate modulation to compensate for path length mismatch; or some combination. In some embodiments, the object is close enough and the transmitted duration long enough that the returns sufficiently overlap the reference signal without a delay.

The transmitted signal is then transmitted to illuminate an area of interest, often through some scanning optics 218. The detector array is a single paired or unpaired detector or a 1 dimensional (1D) or 2 dimensional (2D) array of paired or unpaired detectors arranged in a plane roughly perpendicular to returned beams 291 from the object. The reference beam 207b and returned beam 291 are combined in zero or more optical mixers 284 to produce an optical signal of characteristics to be properly detected. The frequency, phase or amplitude of the interference pattern, or some combination, is recorded by acquisition system 240 for each detector at multiple times during the signal duration D. The number of temporal samples processed per signal duration or integration time affects the down-range extent. The number or integration time is often a practical consideration chosen based on number of symbols per signal, signal repetition rate and available camera frame rate. The frame rate is the sampling bandwidth, often called "digitizer frequency." The only fundamental limitations of range extent are the coherence length of the laser and the length of the chirp or unique phase code before it repeats (for unambiguous ranging). This is enabled because any digital record of the returned heterodyne signal or bits could be compared or cross correlated with any portion of transmitted bits from the prior transmission history.

The acquired data is made available to a processing system 250, such as a computer system described below with reference to FIG. 7, or a chip set described below with reference to FIG. 8. A scanner control module 270 provides scanning signals to drive the scanning optics 218 and/or the source 212 and/or the first and second scanner 241, 244 (FIG. 2G) and/or the optical switches 247 (FIG. 2J), according to one or more of the embodiments described below. In one embodiment, the scanner control module 270 includes instructions to perform one or more steps of the method 600 described below with reference to the flowchart of FIG. 6A and/or method 630 described below with reference to the flowchart of FIG. 6B and/or method 650 described below with reference to the flowchart of FIG. 6C. A signed Doppler compensation module (not shown) in processing system 250 determines the sign and size of the Doppler shift and the corrected range based thereon along with any other corrections. The processing system 250 also includes a modulation signal module (not shown) to send one or more electrical signals that drive modulators 282a, 282b. In some embodiments, the processing system also includes a vehicle control module 272 to control a vehicle on which the system 200 is installed.

Any known apparatus or system may be used to implement the laser source 212, modulators 282a, 282b, beam splitter 216, reference path 220, optical mixers 284, detector array 230, scanning optics 218, or acquisition system 240. Optical coupling to flood or focus on a target or focus past the pupil plane are not depicted. As used herein, an optical coupler is any component that affects the propagation of light within spatial coordinates to direct light from one component to another component, such as a vacuum, air, glass, crystal, mirror, lens, optical circulator, beam splitter, phase plate, polarizer, optical fiber, optical mixer, among others, alone or in some combination.

FIG. 2A also illustrates example components for a simultaneous up and down chirp LIDAR system according to one embodiment. In this embodiment, the modulator 282a is a frequency shifter added to the optical path of the transmitted beam 205. In other embodiments, the frequency shifter is added instead to the optical path of the returned beam 291 or to the reference path 220. In general, the frequency shifting element is added as modulator 282b on the local oscillator (LO, also called the reference path) side or on the transmit side (before the optical amplifier) as the device used as the modulator (e.g., an acousto-optic modulator, AOM) has some loss associated and it is disadvantageous to put lossy components on the receive side or after the optical amplifier. The purpose of the optical shifter is to shift the frequency of the transmitted signal (or return signal) relative to the frequency of the reference signal by a known amount $\Delta f_s$, so that the beat frequencies of the up and down chirps occur in different frequency bands, which can be picked up, e.g., by the FFT component in processing system 250, in the analysis of the electrical signal output by the optical detector 230. In some embodiments, the RF signal coming out of the balanced detector is digitized directly with the bands being separated via FFT. In some embodiments, the RF signal coming out of the balanced detector is pre-processed with analog RF electronics to separate a low-band (corresponding to one of the up chirp or down chip) which can be directly digitized and a high-band (corresponding to the opposite chirp) which can be electronically down-mixed to baseband and then digitized. Both embodiments offer pathways that match the bands of the detected signals to available digitizer resources. In some embodiments, the modulator 282a is excluded (e.g., in direct ranging embodiments).

Figure 2B:
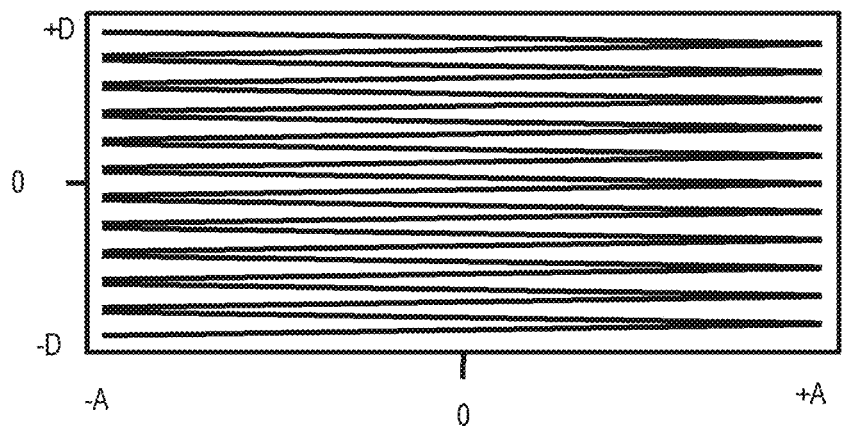
FIG. 2B is a block diagram that illustrates a saw tooth scan pattern for a hi-res Doppler system, used in some embodiments.

FIG. 2B is a block diagram that illustrates a simple saw tooth scan pattern for a hi-res Doppler system, used in some prior art embodiments. The scan sweeps through a range of azimuth angles (horizontally) and inclination angles (vertically above and below a level direction at zero inclination). In various embodiments described below, other scan patterns are used. Any scan pattern known in the art may be used in various embodiments. For example, in some embodiments, adaptive scanning is performed using methods described in World Intellectual Property Organization publications WO 2018/125438 and WO 2018/102188, the entire contents of each of which are hereby incorporated by reference as if fully set forth herein.

Figure 2C:
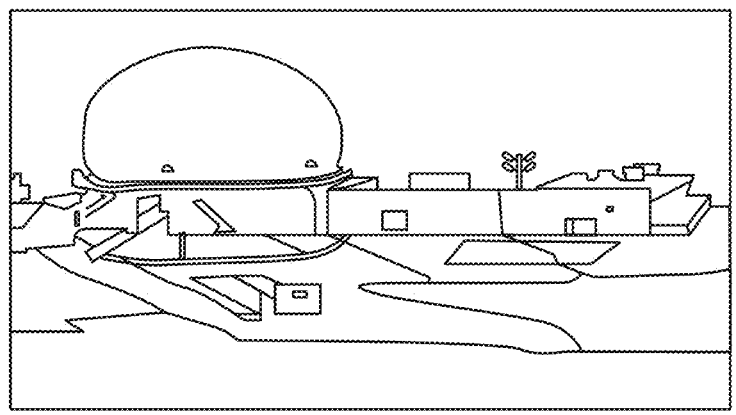
FIG. 2C is an image that illustrates an example speed point cloud produced by a hi-res Doppler LIDAR system, according to an embodiment.
Figure 2D:
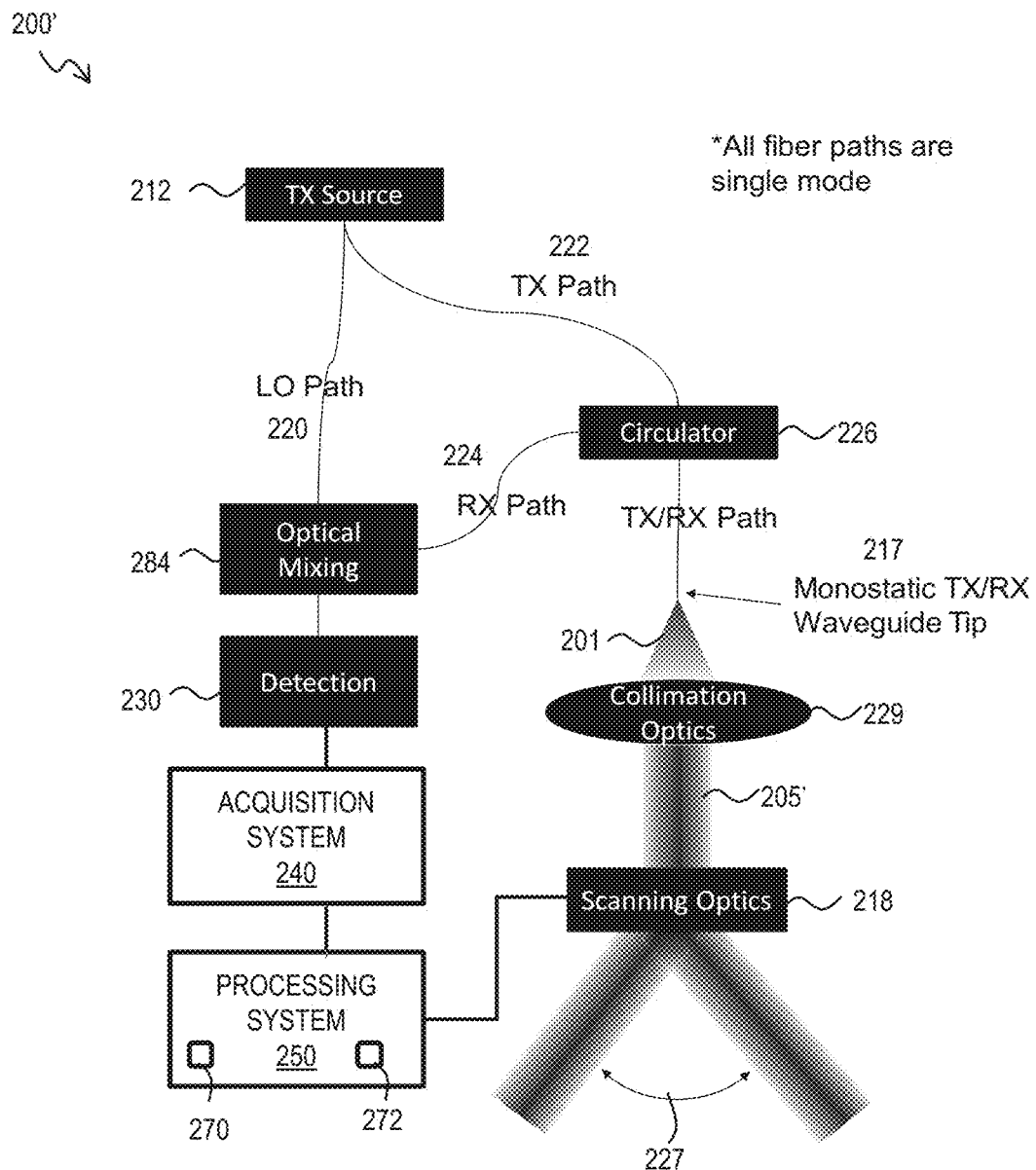
FIG. 2D is a block diagram that illustrates example components of a high resolution (hi res) LIDAR system, according to an embodiment.

FIG. 2C is an image that illustrates an example speed point cloud produced by a hi-res Doppler LIDAR system, according to an embodiment. Each pixel in the image represents a point in the point cloud which indicates range or intensity or relative speed or some combination at the inclination angle and azimuth angle associated with the pixel FIG. 2D is a block diagram that illustrates example components of a high resolution (hi res) LIDAR system 200', according to an embodiment. In an embodiment, the system 200' is similar to the system 200 with the exception of the features discussed herein. In an embodiment, the system 200' is a coherent LIDAR system that is constructed with monostatic transceivers. The system 200' includes the source 212 that transmits the carrier wave 201 along a single-mode optical waveguide over a transmission path 222, through a circulator 226 and out a tip 217 of the single-mode optical waveguide that is positioned in a focal plane of a collimating optic 219 or within about 100 microns (um) or within about 0.1% to about 0.5% of a focal length of the collimating optic 219. In one example embodiment, the collimating optic 219 includes doublets, aspheres or multi-element designs. In an embodiment, the carrier wave 201 exiting the optical waveguide tip 217 is shaped by the optic 229 into a collimated target beam 205' which is scanned over a range of angles 227 by scanning optics 218. In some embodiments, the carrier wave 201 is phase or frequency modulated in a modulator 282a upstream of the collimation optic 229. In other embodiments, modulator 282 is excluded. In an embodiment, return beams 291 from an object are directed by the scanning optics 218 and focused by the collimation optics 229 onto the tip 217 so that the return beam 291 is received in the single-mode optical waveguide tip 217. In an embodiment, the return beam 291 is then redirected by the circulator 226 into a single mode optical waveguide along the receive path 224 and to optical mixers 284 where the return beam 291 is combined with the reference beam 207b that is directed through a single-mode optical waveguide along a local oscillator path 220. In one embodiment, the system 200' operates under the principal that maximum spatial mode overlap of the returned beam 291 with the reference signal 207b will maximize heterodyne mixing (optical interference) efficiency between the returned signal 291 and the local oscillator 207b. This arrangement is advantageous as it can help to avoid challenging alignment procedures associated with bi-static LIDAR systems.

In some embodiments, the system 200' includes more than one waveguide arranged in a waveguide array and where each waveguide in the array has a tip that is positioned in a similar location as the tip 217 in FIG. 2D. In one embodiment, each waveguide of the waveguide array has a respective circulator 226 and a respective optical mixer 284 to combine a respective return beam 291 with a respective reference beam 207b. In other embodiments, the system 200' includes a fewer number of circulators 226 and optical mixers 284 than the number of waveguides so that the system and the system is configured to switch between one or more waveguides at respective time periods so that return beam 291 data from the one or more waveguides is combined at the optical mixers 284 with one or more respective reference beams 207b. This embodiment permits a fewer number of processing channels (e.g. fewer number of circulators 226 and optical mixers 284) than the number of waveguides in the array.

Figure 2E:
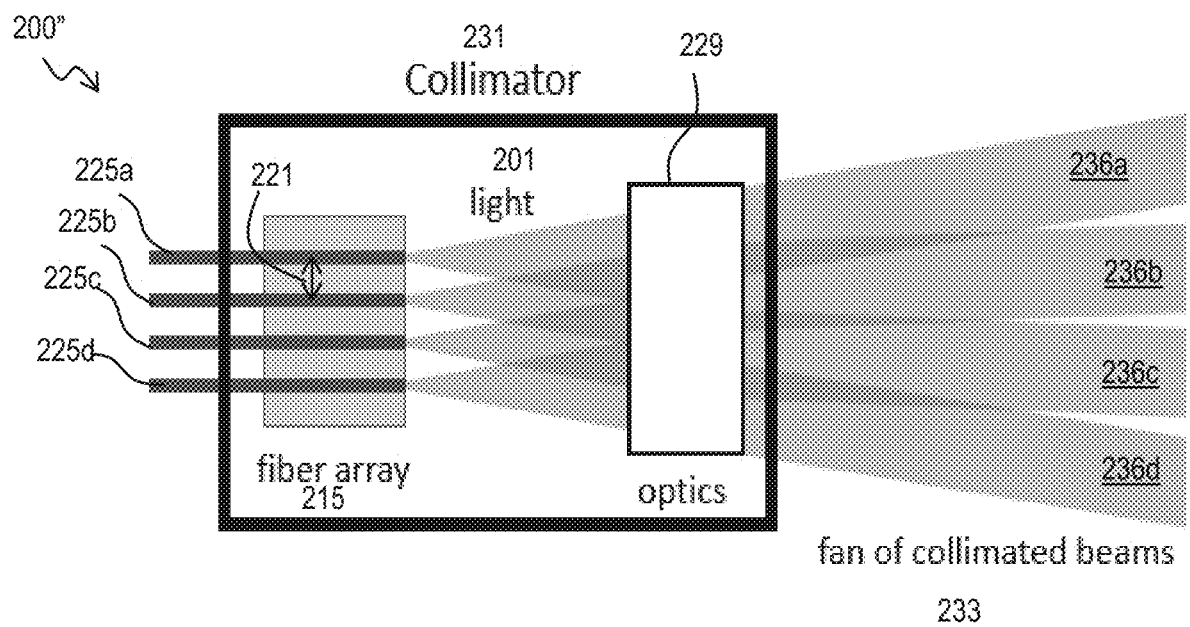
FIG. 2E is a block diagram that illustrates example of a cross-sectional side view of a collimator used in a high-resolution LIDAR system with a waveguide array to form a collimated fan beam, according to an embodiment.

FIG. 2E is a block diagram that illustrates an example cross-sectional side view of a collimator 231 used a LIDAR system, such as system 200 or system 200', with a waveguide array 215 to form a collimated fan beam 233, according to an embodiment. In an embodiment, the LIDAR system includes the waveguide array 215 of a plurality of optical waveguides 225a, 225b, 225c, 225d, collectively referenced hereinafter as waveguides 225. The tip 217 of each waveguide 225a, 225b, 225c, 225d is positioned in a similar manner as the tip 217 of the waveguide 225 of FIG. 2D, e.g. in a focal plane of the collimating optic 229. In some embodiments, the beam 201 from the source 212 is divided by a splitter into multiple waveguides 225a, 225b, 225c, 225d along the transmission path 222 to multiple circulators 226 that direct the beam 201 to the tips 217 of the waveguides 225a, 225b, 225c, 225d. In other embodiments, multiple sources 212 are provided which generate multiple beams 201 that are directed into the multiple waveguides 225. Return beams 291 from the waveguides 225a, 225b, 225c, 225d are transmitted by the multiple circulators 226 to a respective one of multiple optical mixers 284, where each respective return beam 291 is combined with a respective reference beam 207b transmitted through one of a plurality of optical waveguides (not shown) along the reference path 220.

In one embodiment, the fan of collimated beams 233 is a set of collimated laser beams 236a, 236b, 236c, 236d, collectively referenced hereinafter as laser beams 236, which can be used for a scanning LIDAR system. In one example embodiment, a desired beam 236 diameter size is in a range from about 5 millimeters (mm) to about 12 mm and a desired angular separation between beams 236 is in a range from about 0.05 degrees to about 10 degrees. In an example embodiment, an angular spread of the fan of collimated beams 233 is about 2 degrees or in a range from about 0.5 degrees to about 4 degrees or in a range from about 0.05 degrees to about 10 degrees. In an embodiment, the fan of individual collimated beams 233 is generated by passing the diverging beam 201 from the tips 217 of the array 215 through a single collimating optic 229. In some embodiments, beams 201 from each fiber 225 overlap at the collimating optic 229, but emerge from the collimator 231 as the separately collimated beams 236.

In one embodiment, the waveguide array 215 is one of a v-groove optical fiber array, a multi-fiber connector (e.g. separate optical fibers in one connector), an optical fiber bundle (e.g. single optical fiber with multiple cores), a planar lightwave circuit, or other arrangement of closely spaced optical waveguides 225. In some embodiments, a spacing 221 between waveguides 225 is in a range from about 100 μm to about 1000 μm. In one embodiment, the spacing 221 between waveguides 225 is about equal throughout the array 215. In other embodiments, the spacing 221 between waveguides is irregular throughout the array 215 (e.g. the spacing 221 between waveguides 225 is adjusted based on an anticipated target range of a certain angular region of the fan 233 associated with those waveguides 225). In an example embodiment, the waveguide array 215 is a v-groove fiber array where the spacing 221 is in a range from about 125 μm to about 250 μm and the number of waveguides 225 is in a range from about 2 to about 16. In some embodiments, the waveguides 225 are arranged in a linear fashion to form the array 215, however in other embodiments the waveguides 225 are arranged in a two-dimensional fashion to form a two-dimensional array.

In an embodiment, the beams 201 are each emitted from the tips 217 of the waveguides 225 into a solid angle determined by one or more of the cross-sectional size of the waveguide 225 region, the waveguide 225 materials, and/or the wavelength of the beam 201. In one embodiment, A LIDAR system is used with any light wavelength that is compatible with waveguides 225, and any configuration of the waveguide 225. In one example embodiment, the wavelength of the beam 201 from the source 212 is about 1550 nanometers (nm) and/or the waveguide 225 is single-mode with a 10 μm mode field diameter at the end face or tip 217 of the waveguide 225.

Figure 2F:
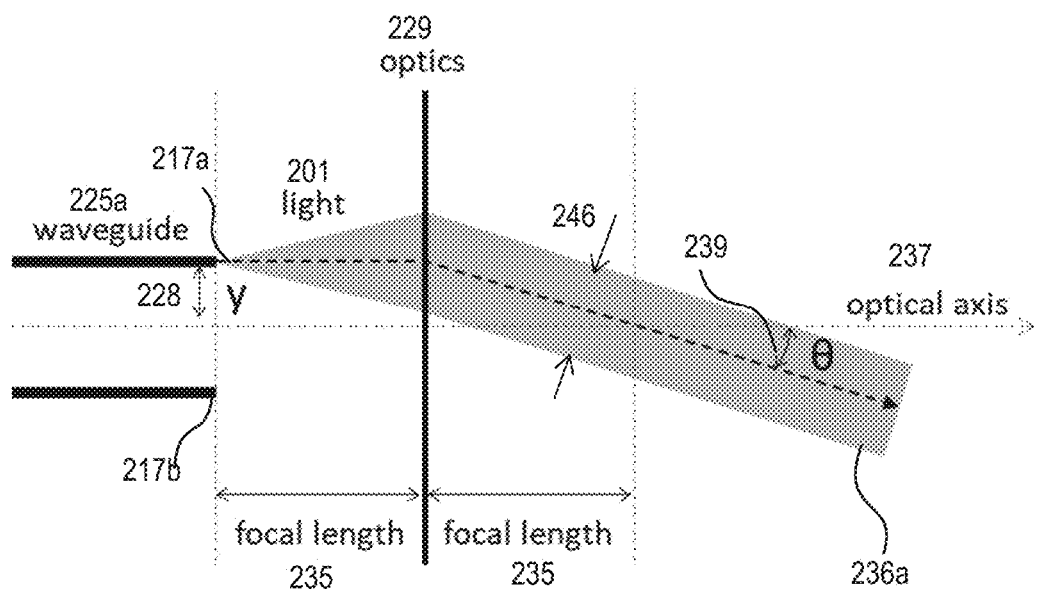
FIG. 2F is a block diagram that illustrates example of a ray diagram of the collimator of FIG. 2E shaping one beam in the collimated fan beam, according to an embodiment.

FIG. 2F is a block diagram that illustrates an example of a ray diagram of the collimator 231 of FIG. 2E shaping one beam 236a in the collimated fan beam 233, according to an embodiment. In an embodiment, the collimating optics 229 are reflective or refractive. In one example embodiment, the collimating optics 229 in a reflective collimator 231 is a parabolic mirror. In another example embodiment, the collimating optics 229 in a refractive collimator 231 includes one or more refractive lens elements. In an embodiment, the effective focal length 235 of the optics 229 determines the collimated beam diameters 246 and, along with the fiber spacing 221, the angular spacing between the collimated beams 236. In an embodiment, the beam diameter 246 depends on the focal length 235, the wavelength of the beam 201 and a mode field diameter (MFD) of the waveguide 225a, which is expressed in Equation 5 below:

$$d = 1.22 * \left( \frac{\lambda * \text{focal length}}{MFD} \right) \quad (5)$$

where λ is the wavelength of the beam 201, MFD is the mode field diameter of the waveguide 225a and the focal length is the focal length 235 of the collimating optics 229. In an example embodiment, the wavelength is about 1500 nanometers (nm) or in a range from about 1400 nm to about 1600 nm; the focal length is about 75 millimeters (mm) or in a range from about 50 mm to about 100 mm; and the MFD is about 10.5 microns (μm) or in a range from about 8 μm to about 12 μm. In an embodiment, a spacing between the waveguide array 215 end face (e.g. tips 217a, 217b of the waveguides 225a, 225b) and the collimating optics 229 is designed to be about equal to the effective focal length 235 of the collimating optics 229.

For purposes of this description, "about equal to" means that the spacing is within a threshold distance (e.g., about 100 μm) or within a threshold percentage of the focal length 235 (e.g. within about ±0.5% of the focal length). This advantageously achieves a high degree of collimation of the output beams 236. In some embodiments, for applications where a set of converging beams 236 are desired, the distance between the array 215 end face and the optics 229 is more than the focal length 235 (e.g. within about +0.5% of the focal length). In other embodiments, for applications where a set of converging beams 236 are desired, the distance between the array 215 end face and the optics 229 is less than the focal length 235 (e.g. within about −0.5% of the focal length). In some embodiments, it is desirable to have a slightly converging set of beams 236.

In some embodiments, an angle θ239 at which a particular beam 236a exits the collimator 231 depends on a distance 228 separating the waveguide tip 217a from an optical axis 237 of the collimating optics 229 and the effective focal length 235 of the collimating optics 229. This is expressed in Equation 6 below:

$$\theta = \tan^{-1} \left( \frac{y}{\text{focal length}} \right) \quad (6)$$

where y is the separation distance 228, and focal length is the focal length 235 of the collimating optics 229.

In some embodiments, the arrangement depicted in FIG. 2F is applicable to a relatively simple collimating system with one or more optical elements that can be modelled as a single element. In other embodiments, multiple optical elements achieve a shorter distance between the waveguide tips 217a, 217b and the output of the collimator 231 while maintaining a desired output beam diameter 246. In one example embodiment, optics are included at the tips 217 of the waveguides 225 to increase a divergence of each beam 201.

4. FAN BEAM SCANNING

Figure 2G:
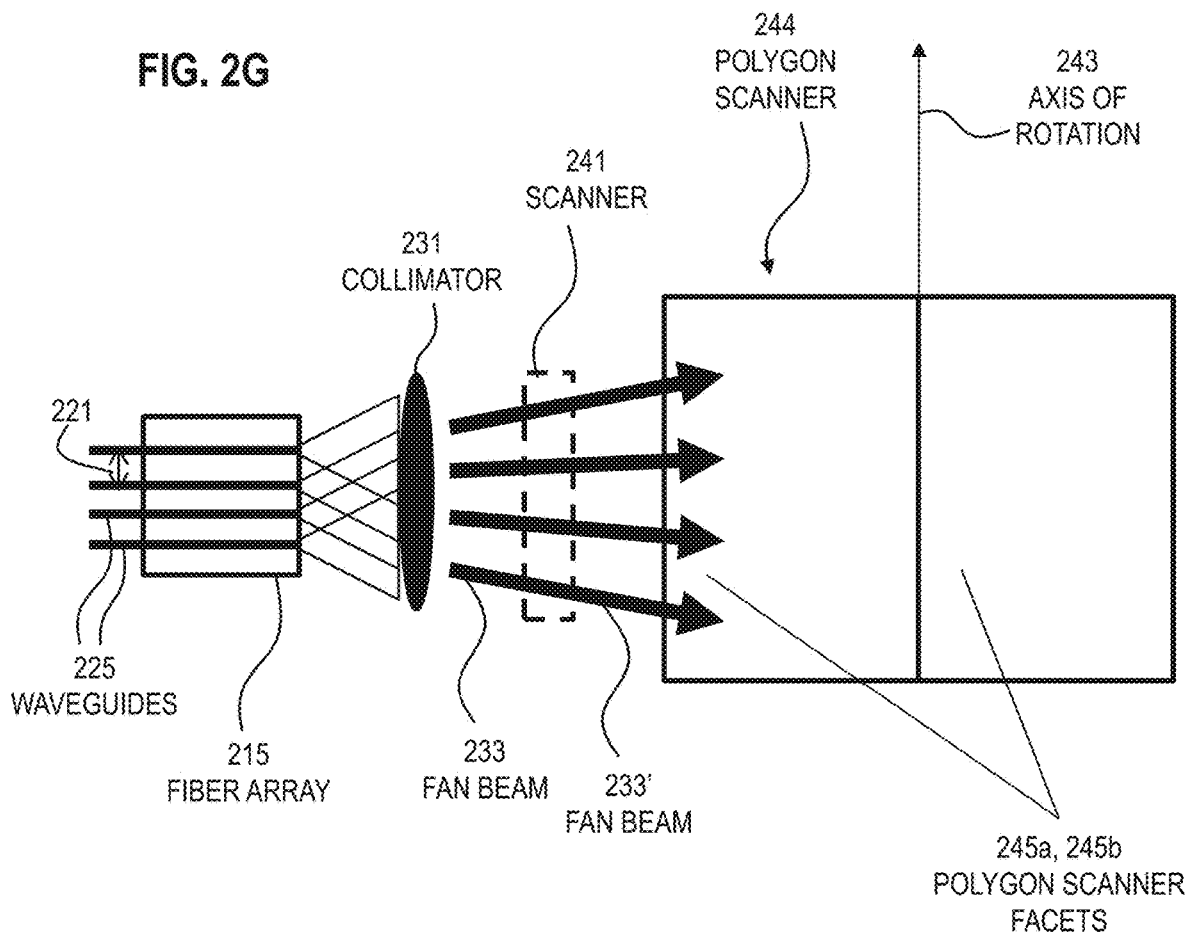
FIG. 2G is a block diagram that illustrates example components to scan a direction of the collimated fan beam of FIG. 2E over a range of angles, according to an embodiment.
Figure 2H:
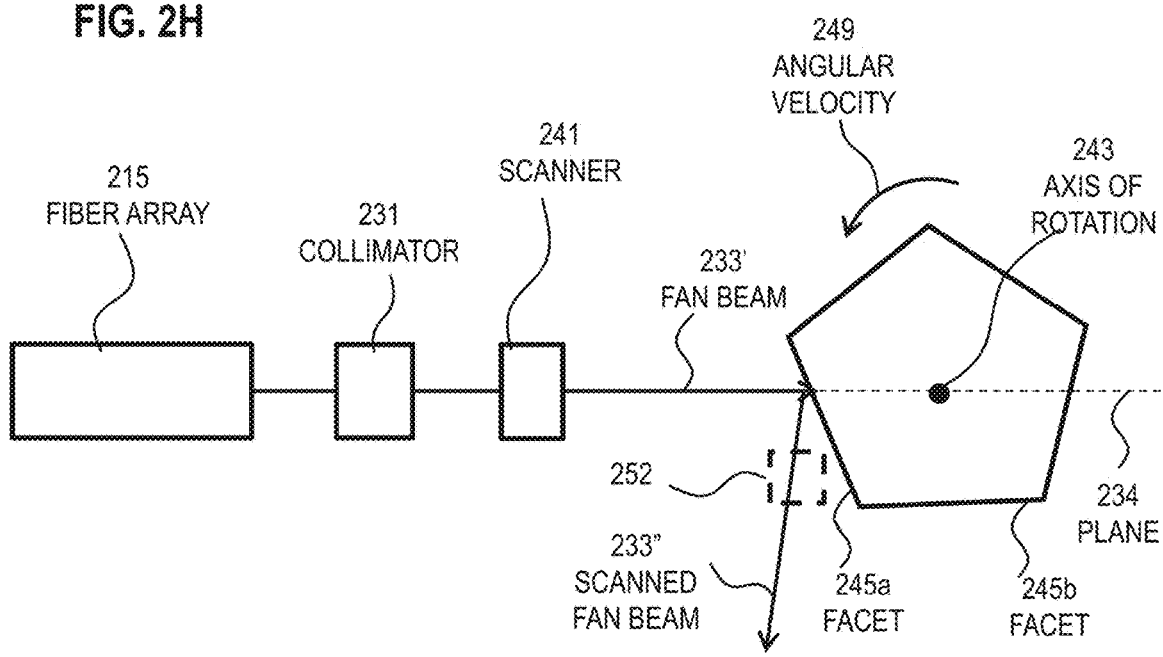
FIG. 2H is a block diagram that illustrates a top view of the components of FIG. 2G, according to an embodiment.

Various embodiments of the scanning optics 218 are used to adjust the direction of the fan of collimated beams 233 in one or more planes, as described herein. FIG. 2G is a block diagram that illustrates example components to scan a direction of the collimated fan beam 233 of FIG. 2E over a range of angles, according to an embodiment. FIG. 2H is a block diagram that illustrates a top view of the components of FIG. 2G, according to an embodiment. For purposes of FIGS. 2G-2H, the waveguides 225 of the array 215 and the collimated fan of beams 233 are arranged in a first plane, e.g. the plane of FIG. 2G or perpendicular plane 234 in FIG. 2H. In an embodiment, a scanner 241 is provided that adjusts a direction of the collimated fan 233 in the first plane, e.g. in the plane of FIG. 2G to generate a modified collimated fan of beams 233'. In one embodiment, the scanner 241 is any reflective or refractive optic that is capable of adjusting the direction of the collimated fan 233 in the first plane. In an example embodiment, the scanner 241 is a galvanometer, a microelectromechanical systems (MEMS) mirror, a voice coil actuated mirror or another polygon scanner.

In an embodiment, a second scanner is also provided that adjusts a direction of the collimated fan of beams 233' in a second plane that is different from the first plane, e.g. a second plane that is different from the plane of the figure in FIG. 2G. In one embodiment, the second plane is about orthogonal (e.g. about 90 degrees±10 degrees) to the first plane, e.g. orthogonal to the plane of FIG. 2G or within the plane of FIG. 2H.

In one embodiment, the second scanner is a polygon scanner 244 with a plurality of facets 245a, 245b that rotates with an angular velocity 249 about an axis of rotation 243. In one example embodiment, the polygon scanner 244 rotates about the axis of rotation 243 with a constant speed. In an example embodiment, the polygon scanner 244 has one or more of the following characteristics: manufactured by Blackmore® Sensors with Copal turned mirrors, has an inscribed diameter of about 2 inches or in a range from about 1 inch to about 3 inches, each mirror is about 0.5 inches tall or in a range from about 0.25 inches to about 0.75 inches, has an overall height of about 2.5 inches or in a range from about 2 inches to about 3 inches, is powered by a three-phase Brushless Direct Current (BLDC) motor with encoder pole-pair switching, has a rotation speed in a range from about 1000 revolutions per minute (rpm) to about 5000 rpm, has a reduction ratio of about 5:1 and a distance from the collimator 231 of about 1.5 inches or in a range from about 1 inch to about 2 inches. As depicted in FIG. 2H, in one embodiment the polygon scanner 244 is positioned so that the first plane 234 (e.g. the plane of FIG. 2G within which the waveguides 225 and collimated fan 233 are arranged) intersects the axis of rotation 243 of the polygon scanner 244. As depicted in FIG. 2G, in another embodiment, the waveguide array 215 features waveguides 225 that are stacked in a direction (e.g. vertical direction in FIG. 2G) that is parallel to the axis of rotation 243.

The intended application for LIDAR system including the collimator 231 and the scanners 241, 244 is for a 3D LIDAR imaging system using scanning laser beams. In an embodiment, one goal of the LIDAR imaging system is to provide as high a coverage of a scene (e.g., as many measured 3D points within a given field of view, or as small a distance between measured 3D points) in as short a time as possible. In one embodiment, having multiple beams 236 within the collimated fan 233 that scan simultaneously increases the coverage in a given amount of time compared to having one beam, so having a multi-beam system is desirable.

In one embodiment, the collimated fan of beams 233' is incident on the facet 245a of the polygon scanner 244 and is redirected by the facet 245a into a collimated fan of beams 233" in the second plane. In one embodiment, a first angle and a second angle of the polygon scanner defines a scan pattern or swipe of the fan 233" in the second plane and the first and second angles are stored in memory 704 of the processing system 250. As the polygon scanner 244 and facet 245a rotate, the fan 233" is redirected within the second plane from the first angle to the second angle to perform a swipe of the beam. In one embodiment, the laser source 212 and the beam 201 remain on as the polygon scanner 244 rotates between facets 245a, 245b and the processing system 250 is timed to only use the scan pattern or swipe of the fan 233" between the first and second angle and to not use portions of the fan 233" outside of this angle range, e.g. portions of the fan 233" that pass between facets 245a, 245b. In this example embodiment, the processing system 250 is timed so to only consider return beams 291 based on the scan pattern or swipe of the fan 233" between the first and second angles along a respective facet 245a, 245b and not to consider return beams 291 based on portions of the fan 233" that pass between the facets 245a, 245b, e.g. that pass over a facet edge between the facets 245a, 245b. In this embodiment, the polygon scanner 244 continuously rotates at a constant speed, in order to maximize efficiency of the LIDAR system. In an embodiment, the LIDAR system performs multiple scan patterns or swipes of the beam and for each scan pattern the processing system 250 is timed so to consider the fan 233" being redirected from the first angle to the second angle within the second plane on each respective facet 245a, 245b of the polygon scanner 244.

FIG. 4A is an image that illustrates an example of multiple interleave swipes 442a, 442b of the collimated fan beam 233" using the system of FIG. 2G, according to an embodiment. In an embodiment, swipe 442a is a first swipe of the fan 233" by the polygon scanner 244 in the second plane from the first angle to the second angle. In one embodiment, after performing the first swipe 442a, the first scanner 241 adjusts the direction of the fan beam 233' in the first plane by an incremental angle 444. In an example embodiment, the incremental angle 444 for the interleave swipes 442a, 442b is about 0.5 degrees or in a range from about 0.05 degrees to about 1 degrees or in a range from about 0.005 degrees to about 2 degrees. In an example embodiment, the incremental angle 444 is less than an angular spread of the fan beam 233' in the first plane. In an embodiment, after the first scanner 241 adjusts the fan beam 233' by the incremental angle 444, the polygon scanner 244 performs a second swipe 442b of the collimated fan beam 233" in the second plane from the first angle to the second angle. A third interleved swipe is indicated by the lightest lines in FIG. 4A. Although three interleave swipes 442a, 442b and the lightest lines are depicted in FIG. 4A, more than three swipes can be interleaved in a similar manner as discussed above with respect to the swipes 442a, 442b. In one embodiment, the swipes 442a, 442b are interleaved based on the spacing 221 of the waveguides 225 in the array 215 being greater than a threshold spacing (e.g. about 500 μm or in a range from about 400 μm to about 600 μm).

To perform the interleaving of the swipes 442a, 442b, the processing system 250 is timed to consider return beams 291 as the fan beam 233" is scanned from the first angle to the second angle over the first swipe 442a; the processing system 250 then transmits a second signal to the scanner 241 to adjust the fan beam 233' in the first plane by the incremental angle 444; and the processing system 250 is further timed to consider return beams 291 as the fan beam 233" is scanned from the first angle to the second angle over the second swipe 442b. In one embodiment, the processing system 250 is timed so to consider the return beams 291 between respective initial and final times when the fan beam 233" is reflected off one of the facets 245 and is scanned from the first angle to the second angle in the second plane between the initial time and the final time. One advantage of the interleaving of the beam swipes 442a, 442b is a higher resolution of return beam 291 data is achieved as compared to use of a single beam 291 (e.g. beam 205' of FIG. 2D).

FIG. 4B is an image that illustrates an example of multiple offset swipes 442a', 442b', 442c' of the collimated fan beam 233" using the scanning system of FIG. 2G, according to an embodiment. In an embodiment, swipe 442a' is a first swipe of the fan 233" by the polygon scanner 244 in the second plane from the first angle to the second angle. In one embodiment, after performing the first swipe 442a', the first scanner 241 adjusts the direction of the fan beam 233' in the first plane by an incremental angle 444'. In an example embodiment, the incremental angle 444' for the offset swipes 442a', 442b' is about 2.5 degrees or selected in a range from about 1 degrees to about 4 degrees or selected in a range from about 0.5 degrees to about 6 degrees. In an example embodiment, the incremental angle 444' about equal to an angular spread of the fan beam 233' in the first plane. In an embodiment, after the first scanner 241 adjusts the fan beam 233' by the incremental angle 444', the polygon scanner 244 performs a second swipe 442b' of the collimated fan beam 233" in the second plane from the first angle to the second angle. The first scanner 214 then adjusts the fan beam 233' by the incremental angle 444' before the polygon scanner 244 performs a third swipe 442c'. Although three offset swipes 442a', 442b', 442c' are depicted in FIG. 4B, more than three swipes can be offset in a similar manner as discussed above with respect to the swipes 442a', 442b', 442c'. In one embodiment, the swipes 442a', 442b', 442c' are offset based on the spacing 221 of the waveguides 225 in the array 215 being less than a threshold spacing (e.g. about 100 μm or in a range from about 80 μm to about 120 μm).

To perform the offset swipes 442a', 442b', 442c', the processing system 250 is timed to consider return beams 291 as the fan beam 233" is scanned from the first angle to the second angle over the first swipe 442a'; the processing system 250 then transmits a second signal to the scanner 241 to adjust the fan beam 233' by the incremental angle 444'; and the processing system 250 is further timed to consider return beams 291 as the fan beam 233" is scanned from the first angle to the second angle over the second swipe 442b'. The processor is similarly timed to consider return beams 291 when the polygon scanner 244 scans the fan beam 233" from the first angle to the second angle over the third swipe 442c'. One advantage of offsetting the beam swipes 442a', 442b', 442c' is faster filling of a field of view as compared to use of a single beam 291 (e.g. beam 205' of FIG. 2D) or interleaving as depicted in FIG. 4A.

FIG. 4C is an image that illustrates an example of one swipe 442" of the collimated fan beam 233" using the system of FIG. 2G where the waveguides 225 in the array 215 are irregularly spaced, according to an embodiment. In an embodiment, the swipe 442" includes a first plurality of beams 446a with a first spacing 448a; a second plurality of beams 446b with a second spacing 448b; and a third plurality of beams 446c with a third spacing 448c, where the third spacing 448c is greater than the second spacing 448b and the second spacing 448b is greater than the first spacing 448a. In an example embodiment, the first spacing 448a is about 0.1 degrees or in a range from about 0.05 degrees to about 0.15 degrees. In an example embodiment, the second spacing 448b is about 0.2 degrees or in a range from about 0.1 degrees to about 0.3 degrees. In an example embodiment, the third spacing 448c is about 0.4 degrees or in a range from about 0.3 degrees to about 0.5 degrees.

In an embodiment, the first plurality of beams 446a are attributable to a first plurality of waveguides 225 having a first spacing 221a; the second plurality of beams 446b are attributable to a second plurality of waveguides 225 having a second spacing 221b; and the third plurality of beams 446c are attributable to a third plurality of waveguides 225 having a third spacing 221c, where the third spacing 221c is greater than the second spacing 221b and the second spacing is greater than the first spacing 221a. In an example embodiment, the first spacing 221a is about 100 µm or in a range from about 80 µm to about 120 µm, the second spacing 221b is about 200 µm or in a range from about 160 µm to about 240 µm and the third spacing 221c is about 400 µm or in a range from about 320 µm to about 480 µm. Although FIG. 4C depicts three different regions of the swipe 442" with different beam spacing in each region, the invention is not limited to three different regions and can generate less or more than three regions of the swipe with different beam spacing.

In another embodiment, the spacing 221 of the array 215 is adjusted so that the spacing 448 of each region 446 of the swipe 442" is based on a target range corresponding to that region 446. In an example embodiment, a region 446a with smaller spacing 448a between the beams is arranged so that the region 446a of the swipe 442" corresponds with large target range (e.g. over 100 m or beam 344 in FIG. 3B) whereas a region 446c with larger spacing 448c is arranged so that the region 446c corresponds with smaller target range (e.g. less than 100 m or beams 342, 346 in FIG. 3B). In another example embodiment, the beam fan 233" forming the swipe 442" provides denser coverage at longer ranges (e.g. larger angular spread for beams 342 directed towards the surface 349 just in front of the vehicle 310 and smaller angular spread for beams 344 that are about parallel to the direction of travel 313 of the vehicle 310, as depicted in FIG. 3B).

Figure 6A:
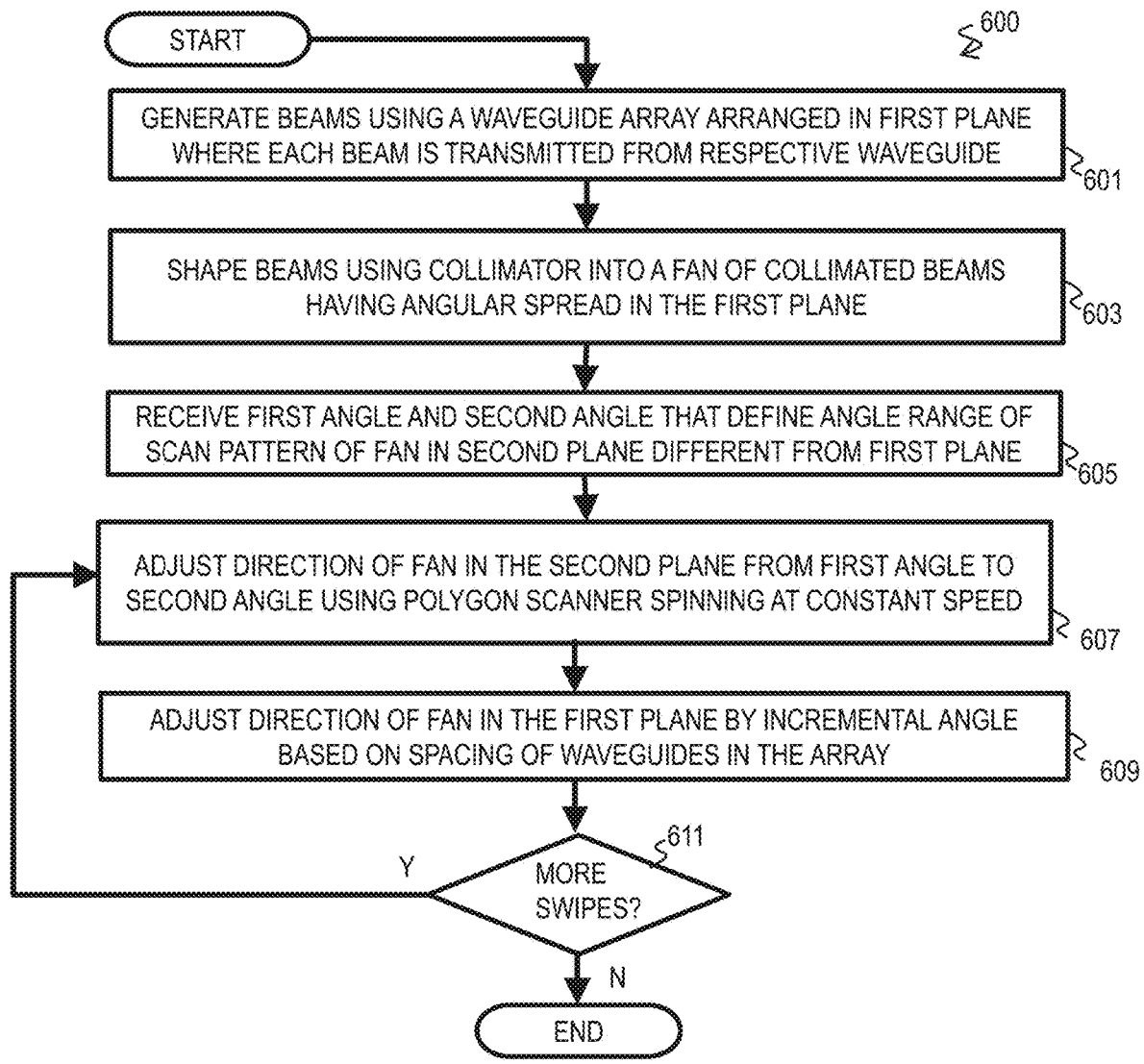
FIG. 6A is a flow chart that illustrates an example method for operating a scanner of a LIDAR system, according to an embodiment.

FIG. 6A is a flow chart that illustrates an example method 600 for operating a scanner of a LIDAR system. Although steps are depicted in FIG. 6A, and in subsequent flowcharts FIGS. 6B and 6C as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

In step 601, a plurality of beams are generated using a waveguide array arranged in a first plane, where each beam is transmitted from a respective waveguide in the array. In an embodiment, in step 601 the plurality of beams 201 are generated using the waveguide array 215 arranged in the first plane (e.g. plane of FIG. 2E/2G or plane 234 of FIG. 2H), where each beam 201 is transmitted from a respective tip 217 of a waveguide 225 of the array 215. In one example embodiment, in step 601 the processing system 250 transmits a signal to the source 212 to transmit one beam 201 that is split into multiple beams that are coupled into each waveguide 225 of the array 215. In another example embodiment, in step 601 the processing system transmits a signal to multiple sources 212 where each source 212 transmits a respective beam 201 that is coupled into each respective waveguide 225 of the array 215.

In step 603, the beams generated in step 601 are shaped with a collimator into a fan of collimated beams that have an angular spread in the first plane. In an embodiment, in step 603 the beams 201 generated with the waveguide array 215 are shaped with the collimator 231 into the fan 233 of collimated beams 236, where the fan 233 has an angular spread in the first plane. In an example embodiment, the fan 233 has an angular spread in the same first plane (e.g. plane of FIG. 2G) that the waveguides 225 are arranged in the array 215. In another embodiment, in step 603 one or more of the position of the tips 217 of the waveguide array 215 relative to the focal plane of the collimating optics 229, the focal length 235, the spacing 221 between the waveguides 225 and distance 228 separating the waveguide 225 from the optical axis 237 are adjusted to achieve the fan 233 with a desired angular spread and beam diameter 246. In some embodiments, one or more of these parameter values are mechanically engineered. In other embodiments, other devices (e.g. switch network) acting behind the waveguides 225 can be used to electronically control the outputs to the multiple waveguides 225.

In step 605, a first angle and a second angle are received that define an angle range of a scan pattern or swipe of the fan 233 in a second plane that is different from the first plane. In an embodiment, in step 605 a first angle and a second angle are input using an input device 712 and/or a pointing device 716 and/or received over a network link 778 of the processing system 250 and stored in the memory 704 of the processing system 250. In an example embodiment, the first angle and the second angle define the initial and final angle through which the fan 233" is swept in the second plane (e.g. plane of FIG. 2H) by the polygon scanner 244. In an example embodiment, the angle range of the scan pattern or swipe is about 20 degrees or in a range from about 15 degrees to about 25 degrees and the first angle is about −15 degrees or within a range from about −20 degrees to about −10 degrees and the second angle is about +5 degrees or within a range from about 0 degrees to about +10 degrees, where the first angle and the second angle are measured with respect a normal to the plane 234. In other embodiments, the angle range depends on the angular spread of the fan 233 so that the bottom of the fan 233 at the first angle (e.g. lowest swipe angle) and the top of the fan 233 at the second angle (e.g. highest swipe angle) covers a vertical field of view (FOV) of interest.

In step 607, the direction of the fan is adjusted in the second plane from the first angle to the second angle using a second scanner. In an example embodiment, step 607 is performed with the polygon scanner 244 so that the fan 233" is adjusted in the second plane from the first angle to the second angle using the polygon scanner 244 that rotates about the axis of rotation 243 with the constant speed. In an example embodiment, in step 607 the processing system 250 is timed so to consider return beams 291 when the polygon scanner 244 scans the fan 233" from the first angle to the second angle within the second plane between the initial and final time. In an embodiment, the processing system 250 is timed to reject return beams 291 that are received when the fan 233" is scanned over angles outside the angle range defined between the first angle and the second angle within the second plane. In an example embodiment, for interleaving swipes, in step 607 the polygon scanner 244 scans the fan 233" from the first angle to the second angle to form swipe 442a. In another example embodiment, for offset swipes, in step 607 the polygon scanner 244 scans the fan 233" from the first angle to the second angle to form swipe 442a'. In still other embodiments, in step 607 for swipes with irregular beam spacing, in step 607 the polygon scanner 244 scans the fan 233" from the first angle to the second angle to form swipe 442". In this example embodiment, for swipes with the irregular beam spacing, steps 609, 611 can be omitted. In other embodiments, for swipes with the irregular beam spacing, steps 609, 611 are performed as described below.

In step 609, the direction of the fan is adjusted in the first plane by an incremental angle based on a spacing of the waveguides in the array. In an embodiment, in step 609, the direction of the fan 233" in the first plane is adjusted by the scanner 241 by the incremental angle 444, 444' based on the spacing 221 of the waveguides 225 in the array 215. In an example embodiment, in step 609, the incremental angle 444 is used for interleaving swipes. In another example embodiment, in step 609, the incremental angle 444' is used for offset swipes. In one embodiment, step 609 is performed after step 607. In another embodiment, in step 609 the processing system 250 transmits a signal to the scanner 241 to adjust the direction of the fan 233' in the first plane by the incremental angle 444, 444'. In other embodiments, step 609 is not performed by the scanner 241 but instead is performed by using different angled facets 245 of the polygon scanner 244 for repeated iterations of step 607, where the facets 245 are angled differently with respect to the axis of rotation 243. In an example embodiment, a first polygon facet 245a is used in a first iteration of step 607 to perform the first swipe 442a and a second polygon facet 245b is used in a second iteration of step 607 to perform the second swipe 442b, where the second polygon facet 245b is angled differently than the facet 245a with respect to the axis of rotation 243 so to adjust the swipe 442b by the incremental angle 444. In one embodiment, adjacent facets 245 of the polygon scanner 244 are angled at differing increments with respect to the axis of rotation 243. In an example embodiment, the differing increment is in a range from about 3 degrees to about 7 degrees. In another example embodiment, each adjacent facet 245 has a differing increment so that the total range of angular increments is in a range from about 15 degrees to about 35 degrees over the polygon scanner 244.

In step 611, a determination is made of how many swipes of the fan have been performed. In an example embodiment, the determination in step 611 is based on a stored field in the memory 704 of the processing system 250, where the stored field is a counter that is incremented for each iteration of step 607. Additionally, in step 611 the processing system 250 compares the determined number of swipes with a desired number of swipes (e.g. two, four, etc.). If the determined number of swipes is less than the desired number of swipes, the method 600 moves back to step 607. If the determined number of swipes is equal to the desired number of swipes, the method ends. In an example embodiment where the desired number of swipes is four, step 611 will move the method 600 back to step 607 three times until in step 611 it is determined that the number of swipes equals the desired number of swipes and the method 600 ends.

5. STEP SCANNING OF FAN BEAM

Figure 5A:
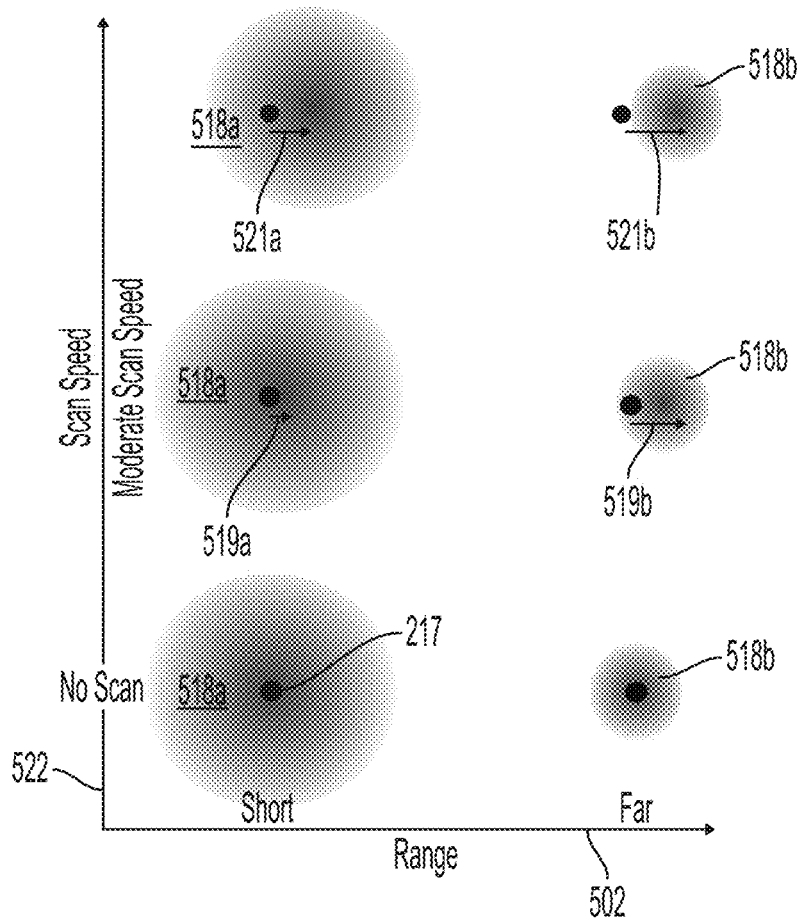
FIG. 5A is an image that illustrates an example of beam walkoff for various target ranges and scan speeds in the system of FIG. 2D, according to an embodiment.

In an embodiment, due to round trip delay of the return beam 291, the receive mode of the return beam 291 will laterally shift or "walk off" from the transmitted mode of the transmitted beam 205' when the beam is being scanned by the scanning optics 218. For the waveguide array 215 of FIG. 2G, the return beam 291 can laterally shift or "walk off" from the transmitted beam 201 at the tip 217 of each respective waveguide 225. FIG. 5A is an image that illustrates an example of beam walkoff for various target ranges and scan speeds in the system 200" of FIG. 2G, according to an embodiment. The horizontal axis 502 indicates target range and the vertical axis 522 indicates scan speed of the beam using the scanning optics 218 (e.g. scanner 241, polygon scanner 244). As FIG. 5A depicts, there is no beam walkoff when the beam is not scanned (bottom row) since the image 518a of the focused return beam 291 is centered on the fiber tip 217 demonstrating no beam walkoff at short target range and the image 518b of the focused return beam 291 is also centered on the fiber tip 217 demonstrating no beam walkoff at far target range. When the beam is scanned at a moderate scan speed (middle row in FIG. 5A), a moderate beam walkoff 519a is observed between the image 518a of the focused return beam 291 and the fiber tip 217 and a larger beam walkoff 519b is observed between the image 518b of the focused return beam 291 and the fiber tip 217. When the beam is scanned at a high scan speed (top row in FIG. 5A), a beam walkoff 521a is observed at short range that exceeds the beam walkoff 519a at the moderate scan speed and a beam walkoff 521b is observed at large range that exceeds the beam walk off 519b at the moderate scan speed. Thus, the beam walkoff increases as the target range and scan speed increase. In an embodiment, increased target range induces a time delay during which the image 518a, 518b shifts away from the tip 217 of the fiber core. Thus, in some embodiments, the LIDAR is operated to account for this walkoff appropriately. In one embodiment, such an operation limits the beam walkoff 519 based on a diameter of the image 518 (e.g. no greater than half of the diameter of the image 518).

Figure 5B:
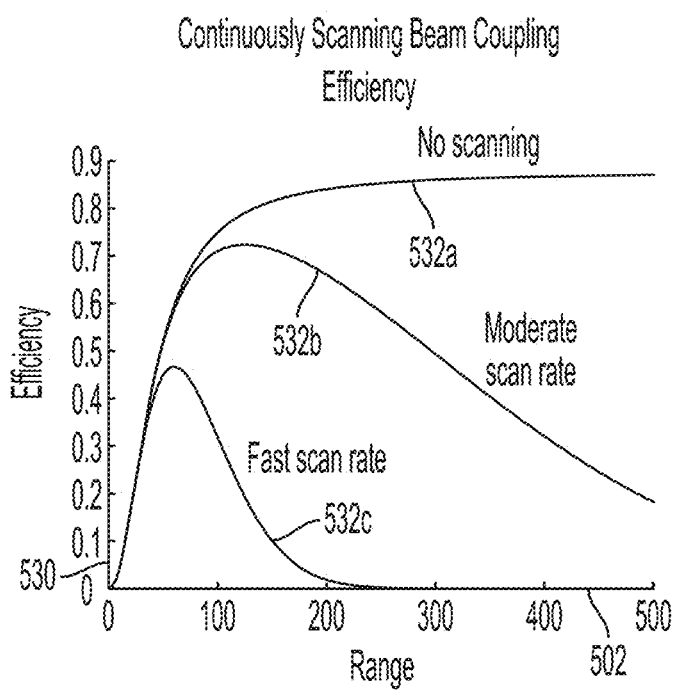
FIG. 5B is a graph that illustrates an example of coupling efficiency versus target range for various scan rates in the system of FIG. 2D, according to an embodiment.

FIG. 5B is a graph that illustrates an example of coupling efficiency versus target range for various scan rates in a LIDAR system, according to an embodiment. The horizontal axis 502 indicates target range in units of meters (m) and the vertical axis 530 indicates coupling efficiency which is unitless. In an embodiment, the coupling efficiency is inversely proportional to the beam walkoff 519. A first trace 532a depicts the coupling efficiency of the focused return beam 291 into the fiber tip 217 for various target ranges based on no scanning of the beam. The coupling efficiency remains relatively high and constant for a wide range of target ranges. A second trace 532b depicts the coupling efficiency of the focused return beam 291 into the fiber tip 217 for various target ranges based on moderate scan rate of the beam. In an embodiment, the coupling efficiency at the moderate scan rate peaks at a moderate target range (e.g. about 120 m) and then decreases as target range increases. A third trace 532c depicts the coupling efficiency of the focused return beam 291 into the fiber tip 217 for various target ranges based on a high scan rate of the beam. In an embodiment, the coupling efficiency of the high scan rate peaks at a low target range (e.g. about 80 m) and then decreases as target range increases.

It is here recognized that beam walk off 519, 521 is avoided and coupling efficiency (and signal to noise ratio or SNR) are optimized when there is no scanning or when the scan rate is minimized. Thus, a scan pattern was developed for the collimated fan 233" in the system of FIG. 2G from the first angle to the second angle within the second plane using a step scan. In an embodiment, the step scan stops the fan 233" at one or more incremental angles between the first and second angle for a minimum time period. In an example embodiment, the incremental angles between the first and second angle are those angles at which LIDAR data (e.g. return beams 291) is desired. In an embodiment, the minimum time period is adjusted based on a return trip time of the return beam 291 from the target and a duration of a waveform in the return beam 291 (e.g. duration of a pulse waveform) to ensure that the waveform of the return beam 291 is received at each waveguide tip 217 before the waveguide is moved to the next angle. In another embodiment, the step scan maximizes the scan rate for those angles between the incremental angles, so to maximize the time efficiency of the scan pattern. This step scan simultaneously maximizes the coupling efficiency and time efficiency of the scan pattern.

In an embodiment, the system of FIGS. 2G-2H includes a second scanner 252 that adjusts the fan 233" in the second plane (e.g. plane of FIG. 2H), in addition to the polygon scanner 244. In an example embodiment, the polygon scanner 244 has a larger field of view (FOV) than the second scanner 252. In another example embodiment, the second scanner 252 is a silicon photonics based optical phased array with fast but minimal tenability. FIG. 4G is a graph that illustrates an example of scan direction of the fan 233" in the second plane based on the scanners 244, 251 in the system of FIG. 2H, according to an embodiment. A first trace 435 indicates an adjusted direction of the fan 233" in the second plane based on the polygon scanner 244. The horizontal axis 430 indicates time in arbitrary units and the vertical axis 432 indicates the direction of the fan 233" in the second plane that is attributable to the polygon scanner 244. In an embodiment, since the polygon scanner 244 rotates at a constant speed, the trace 435 indicates a constant scan rate of the fan 233" in the second plane from the first angle (e.g. at t=0) to the second angle (e.g. at some time t). The constant scan rate of the fan 233" based on trace 435 would reduce the coupling efficiency and SNR of the return beam 291, since it would introduce walk off 519, 521 (e.g. when the constant scan rate exceeds a threshold rate for walk off). Thus a further adjustment is made as described next.

A second trace 437 indicates an adjusted direction of the fan 233" in the second plane based on the second scanner 252. The second trace 437 is advantageously selected so that when combined with the first trace 435, the net adjusted direction of the fan 233" in the second plane is a step scan with optimized parameters. The horizontal axis 430 indicates time in arbitrary units and the vertical axis 434 indicates the direction of the fan 233" in the second plane that is attributable to the second scanner 252. In an embodiment, the trace 437 is a sawtooth pattern with a frequency in a range from about 5 Hertz (Hz) to about 25 Hz and an angular range (e.g., separation between the maximum and minimum angle) in a range from about 15 degrees to about 35 degrees. In other embodiments, a sinusoidal, triangular or other arbitrary pattern is used instead of the sawtooth pattern trace 437, provided that the other pattern encourages more density at the middle of the angular range. In one embodiment, the sawtooth pattern of trace 437 features an angled portion and a vertical portion, where the angled portion runs in an opposite direction to the direction of trace 435 for the same time increment. In one example embodiment, the slope of the angled portion is selected to be equal and opposite to the slope of trace 435 so to achieve the flat portion of the step scan over the time duration 450.

A third trace 439 indicates a net adjusted direction of the fan 233" in the second plane based on the polygon scanner 244 and the second scanner 252, e.g. based on combination of scans 435, 437. The vertical axis 436 indicates the net adjusted direction of the fan 233" in the second plane. In an embodiment, the step scan of trace 439 includes steps with a time duration 450 and an angular increment 454 height. In an example embodiment, the angular increment 454 is in a range from about 0.05 degrees to about 0.2 degrees. In an embodiment, the step scan of trace 439 indicates that the scan angle of the fan 233" is stopped at incremental angles (e.g. angles that are separated by angular increments 454) between the first angle and the second angle for the time duration 450. Additionally, in an embodiment, the step scan of trace 439 indicates that the scan rate is maximized between the incremental angles. This advantageously maximizes the collection efficiency and SNR of the return beam 291 received at each incremental angle while at the same time maximizing the time efficiency of the scan pattern.

In an embodiment, the angular increment 454 is selected so that return beam 291 data is obtained at a desired angular resolution between the first and second angle over the second plane. In another embodiment, the time duration 450 is selected to provide sufficient time to transmit the beam 201 from the waveguide array 215, receive an initial portion of the return beam 291 and receive a remaining portion of the return beam 291 at the waveguide tip 217. FIG. 4F depicts one embodiment where the time duration 450 is adjusted based on a sum of the return trip time 420 (e.g. based on a transmit time 424 and a return time 426 of the initial portion of the return beam 291) and an additional time 422 that is based on a duration of the waveform in the return beam 291. This advantageously ensures that a waveform in the return beam 291 is received at each waveguide tip 217 before the fan 233" is moved from a first incremental angle to a second incremental angle of the step scan.

Figure 6B:
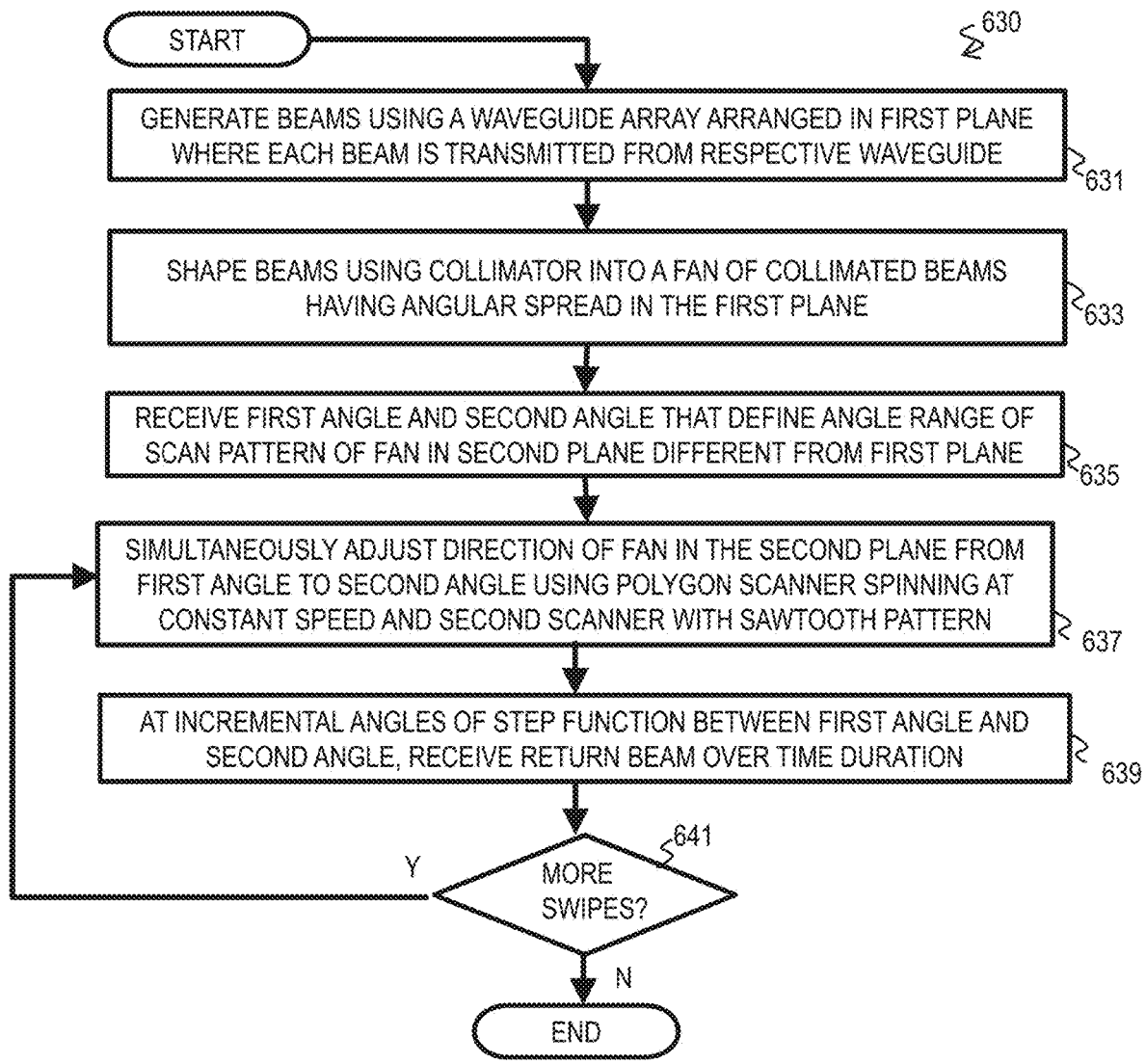
FIG. 6B is a flow chart that illustrates an example method for operating a scanner of a LIDAR system, according to an embodiment.

FIG. 6B is a flow chart that illustrates an example method 630 for operating a scanner of a LIDAR system, according to an embodiment. Steps 631, 633 and 635 are similar to steps 601, 603, 605.

In step 637, the direction of the fan 233" is simultaneously adjusted in the second plane using the polygon scanner 244 and the second scanner 252. In an embodiment, in step 637 the processing system 250 transmits signals to the polygon scanner 244 and the second scanner 252, where the signal to the polygon scanner 244 causes the scanner 244 to rotate at the constant speed and the signal to the scanner 252 causes the scanner 252 to adjust a direction of the fan 233" in the second plane, e.g. based on the sawtooth trace 437.

In step 639, at incremental angles of the step function between the first angle and the second angle, the beam 201 is transmitted from the waveguides of the array 215 and the return beam 291 is received at the waveguides of the array 215. In an embodiment, the incremental angles are defined by the angular increments 454 of the step scan trace 439. In one embodiment, the scan of the fan 233" commences at the first angle. The fan 233" is scanned at a maximum scan rate between the first angle and a first incremental angle, based on the step scan trace 439. At the first incremental angle, the fan 233" is held at the first incremental angle for the time duration 450. In an embodiment, the source 212 and the beam 201 remain on during the step scan trace 439. In an example embodiment, the processing system 250 is timed to exclude return beams 291 received between the angular increments 454 and to consider return beams 291 received during the time durations 450 at each angular increment 454 of the step scan trace 439. The return beam 291 is received at the tip of the waveguide array 215 over the time duration 450. In an embodiment, after the time duration 450, the fan 233" is re-scanned at the maximum scan rate from the first incremental angle by the angular increment 454 to a second incremental angle. In an example embodiment, the fan 233" stays at the second incremental angle for the time duration 450 and the processing system 250 is timed to consider return beams 291 received over the time duration 450. This is repeated for each incremental angle between the first angle and the second angle over the second plane.

In step 641, it is determined whether additional scans or swipes of the fan 233" are to be performed. The determination in step 641 is based on comparing a completed number of swipes of the fan 233" with a desired number of swipes of the fan 233". In an example embodiment, the completed number of swipes of the fan 233" is a counter that is stored in the memory 704 of the processing system 250 and is incremented for each iteration of step 639. In another example embodiment, the desired number of swipes of the fan 233" is a stored number in the memory 704. If the determination in step 641 is positive, the method 630 moves to block 637. If the determination in step 641 is negative, the method 630 ends. In some embodiments, step 609 of method 600 can be employed in the method 630 so that the method 630 can be used to perform interleave or offset swipes.

6. SCANNING WITH OPTICAL SWITCHES

In some embodiments, the LIDAR system features fewer processing channels (e.g. number of circulators 226, optical mixers 284, number of waveguides within the paths 220, 222, 224) than the number of waveguides 225 in the array 215. This advantageously permits the LIDAR system to be simpler and more cost efficient. However, in order to process return beam 291 data from multiple waveguides 225 of the array 215 in this system, the system switches between one or more waveguides 225 in the array 215 at respective time periods, so that the number of waveguides 225 being used to transmit the beam 201 and receive the return beam 291 does not exceed the number of processing channels.

In an embodiment, optical switches are used to direct light to any of the waveguides 225 individually for a temporal serialization of measurements at each waveguide tip 217. This advantageously allows a distribution of LIDAR resources across space with near instantaneous switching between angular measurement directions. In an example embodiment, fast optical switches with sub 50 nanosecond switch time are employed. This switch time is much shorter than measurement integration times used in many applications. In another example embodiment, integrated photonics platforms can also form the basis of low loss switches using multi-mode interference structures to appropriate phase control of inputs.

Figure 2I:
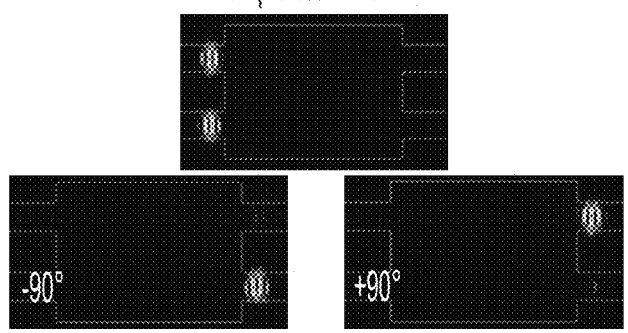
FIG. 2I is a block diagram that illustrates example optical switches used in the system of FIG. 2G to switch between one or more waveguides of the array, according to an embodiment.
Figure 2I:
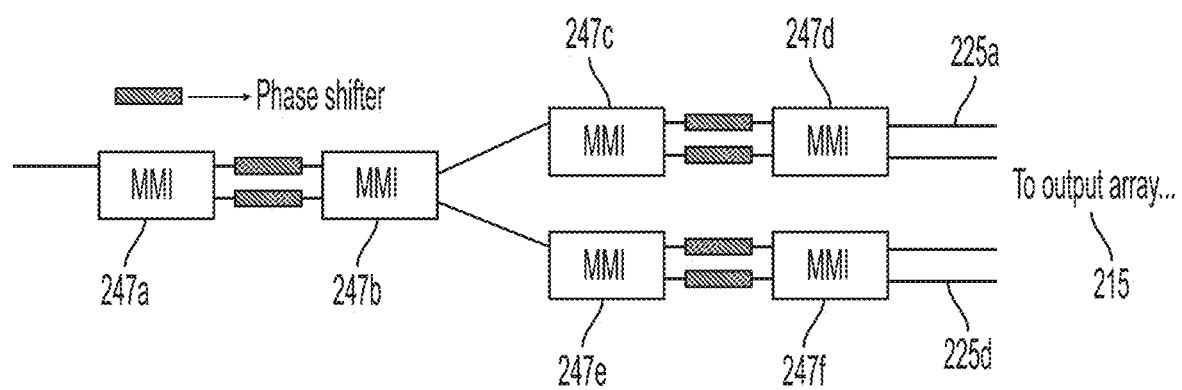

FIG. 2I is a block diagram that illustrates example optical switches 247 used in the system of FIG. 2G to switch between one or more waveguides 225 of the array 215, according to an embodiment. In one embodiment, each optical switch 247 is an MMI switch that is coupled to a phase shifter. A first pair of switches 247a, 247b are selectively activated, to route the beam 201 to either the waveguides 225a, 225b (e.g. switch 247a) or to the waveguides 225c, 225d (e.g. switch 247b). A second pair of switches 247c, 247d are selectively activated to route the beam 201 to either the waveguide 225a (e.g. switch 247c) or waveguide 225b (e.g. switch 247d). A third pair of switches 247e, 247f are selectively activated to route the beam 201 to either the waveguide 225c (e.g. switch 247e) or waveguide 225d (e.g. switch 247f).

In an example embodiment, the switch 247 is activated based on a signal transmitted to the switch 247 from the processing system 250. In one example embodiment, the LIDAR system transmits the beam 201 through the waveguide 225a over a first time period by the processing system 250 transmitting a signal to a first plurality of switches (e.g. switches 247a, 247c) over the first time period. During the first time period, the beam 201 is transmitted from the tip 217 of the first waveguide 225a and a return beam 291 is received at the tip of the first waveguide 225a. Similarly, in another example embodiment, the LIDAR system transmits the beam 201 through the waveguide 225b over a second time period (e.g. after the first time period) by the processing system 250 transmitting a signal to a second plurality of switches (e.g. switches 247a, 247d) over the second time period. The beam 201 is then transmitted from the tip 217 of the second waveguide 225b and the return beam 291 is received at the tip 217 of the second waveguide 225b over the second time period. The system can similarly switch between one or more waveguides 225 over respective time periods, in order to transmit the beam 201 and receive the return beam 291 from the one or more waveguides 225 over the respective time periods.

FIG. 4F is a graph that illustrates an example of a time axis 410 indicating the switch time values between adjacent waveguides 225, according to an embodiment. The activation time 424 indicates when the first time period commences that the first waveguide 225a is activated, e.g. the processing system 250 transmits the signals to the switches 247a, 247c at the activation time 424. The beam 201 is transmitted from the tip 217 of the first waveguide 225a beginning at the activation time 424. A return trip time 420 is waited for a first portion of the return beam 291 to be received at the tip 217 of the first waveguide 225a at the return time 426. A waveform time 422 is then waited which is based on a duration of the waveform of the return beam 291 (e.g. 3.6 μsec) until a switch time 428 is reached which is the time when the system 200" switches from the first waveguide 225a to the second waveguide 225b.

Thus, in one embodiment, the first time period that the first waveguide 225a remains activated is a sum of the return trip time 420 and the duration of the beam (e.g. waveform time 422). In an example embodiment, after the first time period, the processing system 250 transmits signals to switches 247a, 247c to deactivate waveguide 225a and transmits signals to switches 247a, 247d over a second time period to activate the waveguide 225b, where the duration of the second time period is about equal to the duration of the first time period. In an embodiment, the system 200" switches between each waveguide 225 of the array 215 in this manner. In other embodiments, the system 200" switches between more than one waveguide 225 at a time, where the time period that the waveguides 225 remain active is about equal to the first time period above. In these embodiments, the system 200" features more than one processing channels (e.g. more than one circulator 226, mixer 284, etc.). In another embodiment, the switch time (e.g. about 50 nanoseconds) between the end of the first time period and commencement of the second period is less than an integration time of the return beam 291 in the LIDAR system, so not to incur a duty cycle penalty during switching.

In an embodiment involving optical switches, a slow mechanical scanner is paired with a switched array arranged orthogonally to the scan direction. In one embodiment, the scanner 241 of FIG. 2G is a slow mechanical scanner that adjusts a gross trajectory of the fan beam 233 in a two dimensional space defined by the first plane (e.g. plane of FIG. 2G) and the second plane (e.g. plane that is orthogonal to the plane of FIG. 2G), while the fan beam 233 angular spread remains in the first plane or aligned in a plane that is parallel to the first plane. In this embodiment, the polygon scanner 244 is omitted. In an example embodiment, the slow mechanical scanner 241 is one of a galvanometer, a MEMS mirror and a voice coil based steering mirror.

Figure 4D:
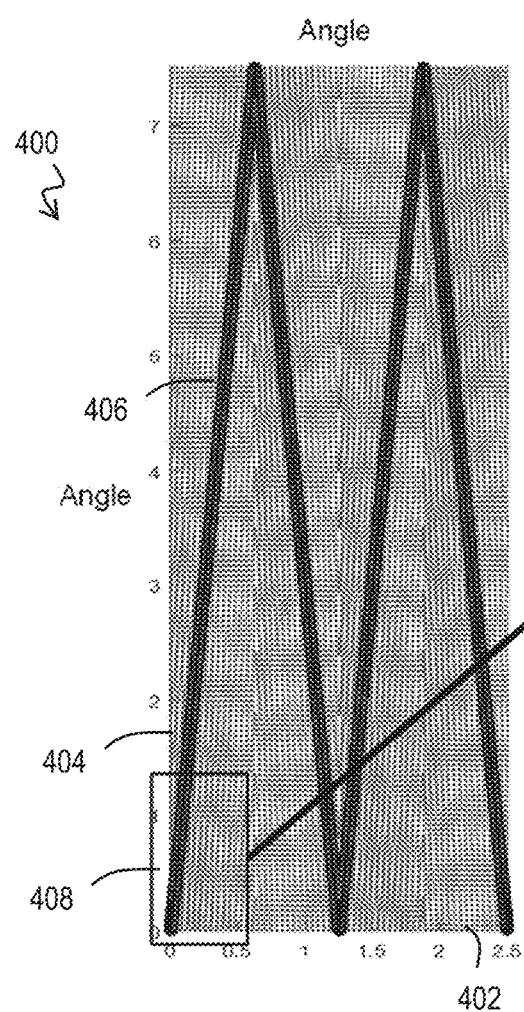
FIG. 4D is a graph that illustrates a gross trajectory of a collimated fan beam scanned with a mechanical scanner, according to an embodiment.
Figure 4E:
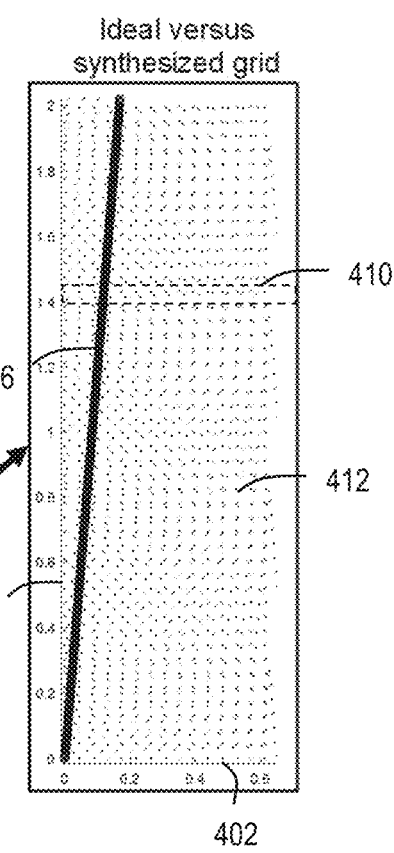
FIG. 4E is a graph that illustrates the gross trajectory of FIG. 4D and return beam data received from the waveguide array based on switching between waveguides, according to an embodiment.
Figure 4F:
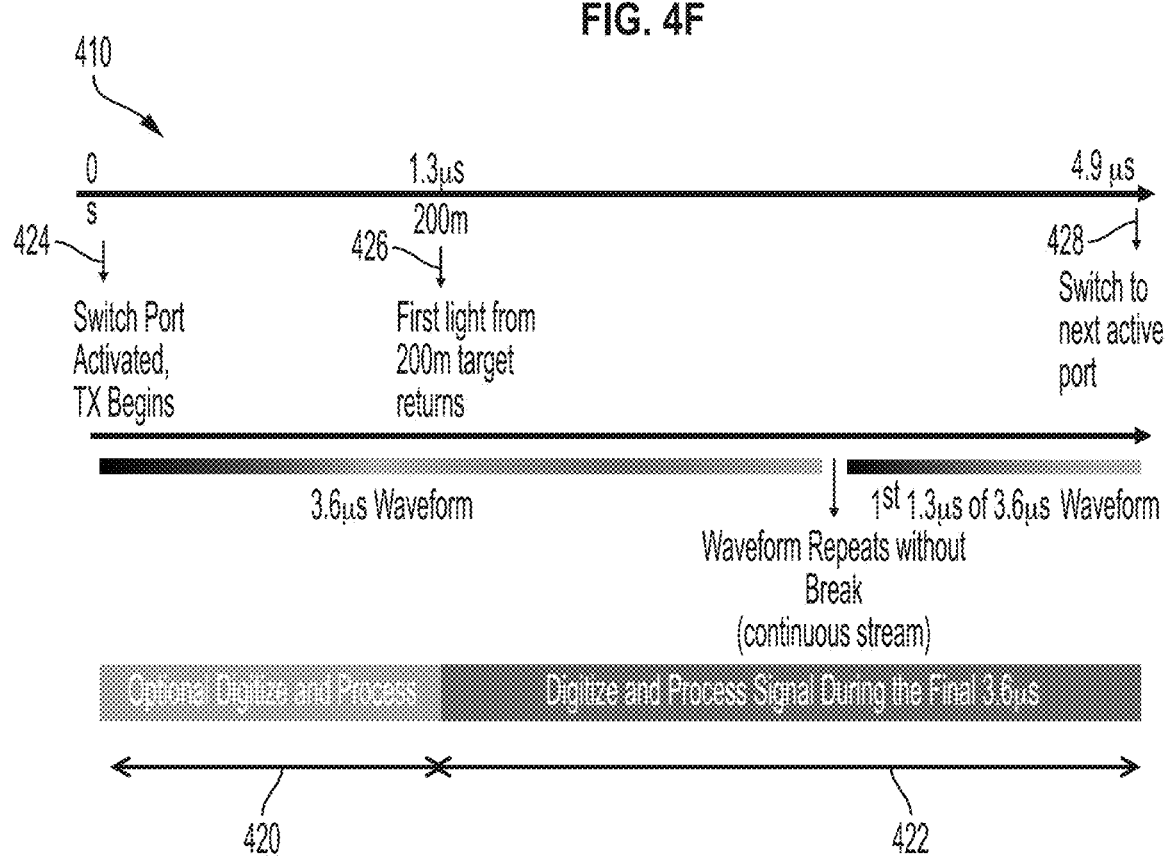
FIG. 4F is a graph that illustrates an example of a time axis indicating the switch time values between adjacent waveguides to generate the return beam data in FIG. 4E, according to an embodiment.
Figure 4G:
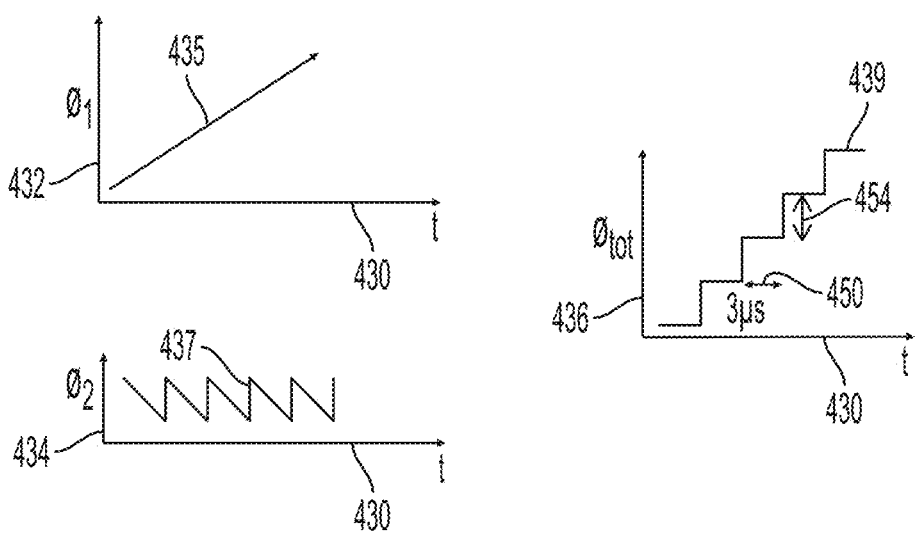
FIG. 4G is a graph that illustrates an example of scan direction versus time for the scanners in the system of FIG. 2G, according to an embodiment.

FIG. 4D is a graph 400 that illustrates a gross trajectory 406 of a collimated fan beam 233 scanned with the mechanical scanner 241, according to an embodiment. The horizontal axis 402 indicates the direction or angle of the fan beam 233 in the first plane (e.g. plane of FIG. 2G). The vertical axis 404 indicates the direction or angle of the fan beam 233 in the second plane (e.g. plane that is perpendicular to FIG. 2G). FIG. 4E is a graph that illustrates the gross trajectory 406 of FIG. 4D and return beam data 410 received from the waveguide array 215 based on switching between waveguides 225, according to an embodiment. In an embodiment, the scanner 241 commences to adjust a first component of the trajectory 406 (e.g. angle of the fan 233 in the first plane) and a second component of the trajectory 406 (e.g. angle of the fan 233 in the second plane). During the adjustment of the fan 233 along the trajectory 406 by the scanner 241, the fan 233 remains parallel to the first plane. At each incremental position along the trajectory 406, the LIDAR system switches between one or more waveguides 225 in the array 215 so to collect return beam 291 data over the angular span 410 of the fan 233 at each incremental position.

In an embodiment, the trajectory 406 of FIG. 4D demonstrates the gross scan trajectory of the mechanical scanner 241. In an embodiment, the array of dots 410 demonstrates the various points which would be accessed by sequentially switching between lateral positions (e.g. switching between waveguides 225) during the course of the vertical scan. In an embodiment, FIG. 4E shows that a reasonable grid of points can be synthesized by this approach. To make the approach work with a mechanical scanner 241 that is also scanning laterally, a subset of the switch nodes would be utilized at any position. This subset could be shifted laterally to counteract the motion of the gross scanning. The result would be rectangular grids of sample regions.

FIG. 6C is a flow chart that illustrates an example method 650 for operating a scanner of a LIDAR system, according to an embodiment. In an embodiments, steps 651, 653, 655 are similar to steps 601, 603, 605.

In step 657, the scanner 241 adjusts a first component of the trajectory 406 (e.g. angle of the fan 233 in the first plane) by a first incremental angle over an incremental time period. In an embodiment, the first incremental angle is in a range from about 0.05 degrees to about 0.2 degrees. In step 659, the scanner 241 adjusts a second component of the trajectory 406 (e.g. angle of the fan 233 in the second plane) by a second incremental angle over the incremental time period. In an embodiment, the second incremental angle is in a range from about 0.05 degrees to about 0.5 degrees. In an embodiment, in step 657 and 659, the processing system 250 transmits one or more signals to the scanner 241 so that the first and second component of the trajectory 406 are adjusted. In other embodiments, the processing system 250 transmits one signal to the scanner 241 to commence the adjustment over the trajectory 406. In an embodiment, the second incremental angle is greater than the first incremental angle. In another embodiment, the ratio of the second incremental angle to the first incremental angle is at least 2 or at least 5 or at least 10.

In step 661, after the scanner 241 adjusts the trajectory 406 in steps 657 and 659, the LIDAR system switches between each waveguide 225 in the array 215 over a respective time period, so that the beam 201 is transmitted from each waveguide tip 217 and the return beam 291 is received at each waveguide tip 217 over the respective time period. In an example embodiment, the processing system 250 transmits one or more signals to switches 247 to switch between each waveguide 225. In an embodiment, a speed of the scanner 241 is sufficiently slow that step 661 can be performed to switch between each waveguide 225 of the array 215 before the scanner 241 re-adjusts the trajectory 406 to a different location along the trajectory 406. In an example embodiment, the speed of the scanner 241 is in a range from about 500 degrees per second to about 1000 degrees per second or further in a range from about 200 degrees per second to about 1500 degrees per second.

In step 663, it is determined whether the second component of the trajectory 406 (e.g. angle of the fan 233 in the second plane) reached either the first angle or second angle received in step 655. In an embodiment, the scanner 241 transmits data to the processing system 250 including the angle of the fan 233 in the second plane at each location along the trajectory 406 and the processing system 250 compares this angle with the first angle and second angle stored in a memory 704 of the processing system 250. If the received angle does not correspond with the first or second angle, the method 650 moves back to block 657. This indicates that the second component of the trajectory 406 (e.g. vertical 404) has not yet reached the first angle or second angle (e.g. 0 degrees or 7.5 degrees in FIG. 4D). Thus, the method 650 moves back to block 657 so that the scanner 241 continues to adjust the trajectory 406. If the received angle corresponds with the first angle or second angle, the method 650 moves to block 665 where it is determined whether the fan 233 has yet to be scanned through a predetermined number of swipes. In an example embodiment, in step 655, when it determined in step 663 that the received angle corresponds with the first angle or second angle, the processing system 250 increments a counter of a number of swipes of the fan 233 stored in the memory 704. In step 665, the processor 250 determine whether the number of swipes stored in the memory 704 is less than a predetermined number of swipes stored in the memory. If the determination in step 665 is affirmative, the method 650 moves back to block 657. If the determination in step 665 is negative, the method 650 ends. In an example embodiment, FIG. 4D depicts four swipes of the fan 233 between the first and second angles along the vertical axis 404.

7. VEHICLE CONTROL OVERVIEW

In some embodiments a vehicle is controlled at least in part based on data received from a hi-res Doppler LIDAR system mounted on the vehicle.

Figure 3A:
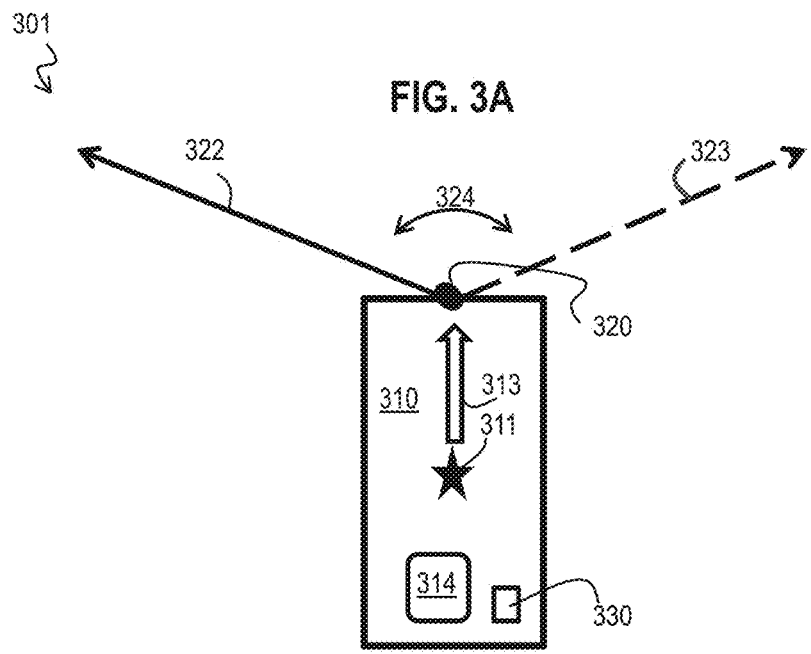
FIG. 3A is a block diagram that illustrates an example system that includes at least one hi-res LIDAR system mounted on a vehicle, according to an embodiment.
Figure 3B:
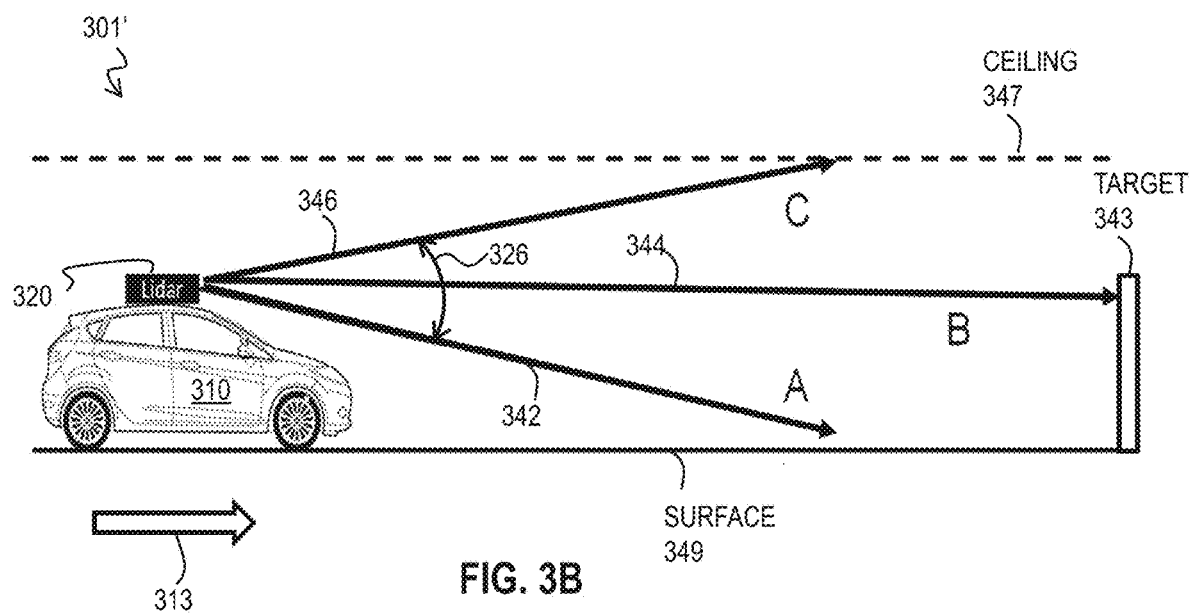
FIG. 3B is a block diagram that illustrates an example system that includes at least one hi-res LIDAR system mounted on a vehicle, according to an embodiment.

FIG. 3A is a block diagram that illustrates an example system 301 that includes at least one hi-res Doppler LIDAR system 320 mounted on a vehicle 310, according to an embodiment. In an embodiment, the LIDAR system 320 is similar to one of the LIDAR systems 200, 200', 200". The vehicle has a center of mass indicted by a star 311 and travels in a forward direction given by arrow 313. In some embodiments, the vehicle 310 includes a component, such as a steering or braking system (not shown), operated in response to a signal from a processor, such as the vehicle control module 272 of the processing system 250. In some embodiments the vehicle has an on-board processor 314, such as chip set depicted in FIG. 8. In some embodiments, the on-board processor 314 is in wired or wireless communication with a remote processor, as depicted in FIG. 7. In an embodiment, the processing system 250 of the LIDAR system is communicatively coupled with the on-board processor 314 or the processing system 250 of the LIDAR is used to perform the operations of the on board processor 314 so that the vehicle control module 272 causes the processing system 250 to transmit one or more signals to the steering or braking system of the vehicle to control the direction and speed of the vehicle. The hi-res Doppler LIDAR uses a scanning beam 322 that sweeps from one side to another side, represented by future beam 323, through an azimuthal field of view 324, as well as through vertical angles (FIG. 3B) illuminating spots in the surroundings of vehicle 310. In some embodiments, the field of view is 360 degrees of azimuth. In some embodiments the inclination angle field of view is from about +10 degrees to about −10 degrees or a subset thereof.

In some embodiments, the vehicle includes ancillary sensors (not shown), such as a GPS sensor, odometer, tachometer, temperature sensor, vacuum sensor, electrical voltage or current sensors, among others well known in the art. In some embodiments, a gyroscope 330 is included to provide rotation information.

FIG. 3B is a block diagram that illustrates an example system 301' that includes at least one hi-res LIDAR system 320 mounted on the vehicle 310, according to an embodiment. In an embodiment, the LIDAR system 320 is similar to the system 200 or system 200' or system 200". In one embodiment, the vehicle 310 moves over the surface 349 (e.g. road) with the forward direction based on the arrow 313. The LIDAR system 320 scans over a range of angles 326 from a first beam 342 oriented at a first angle measured with respect to the arrow 313 to a second beam 346 oriented at a second angle measured with respect to the arrow 313. In one embodiment, the first angle and the second angle are vertical angles within a vertical plane that is oriented about orthogonal with respect to the surface 349. For purposes of this description, "about orthogonal" means within ±20 degrees of a normal to the surface 349.

8. COMPUTATIONAL HARDWARE OVERVIEW

Figure 7:
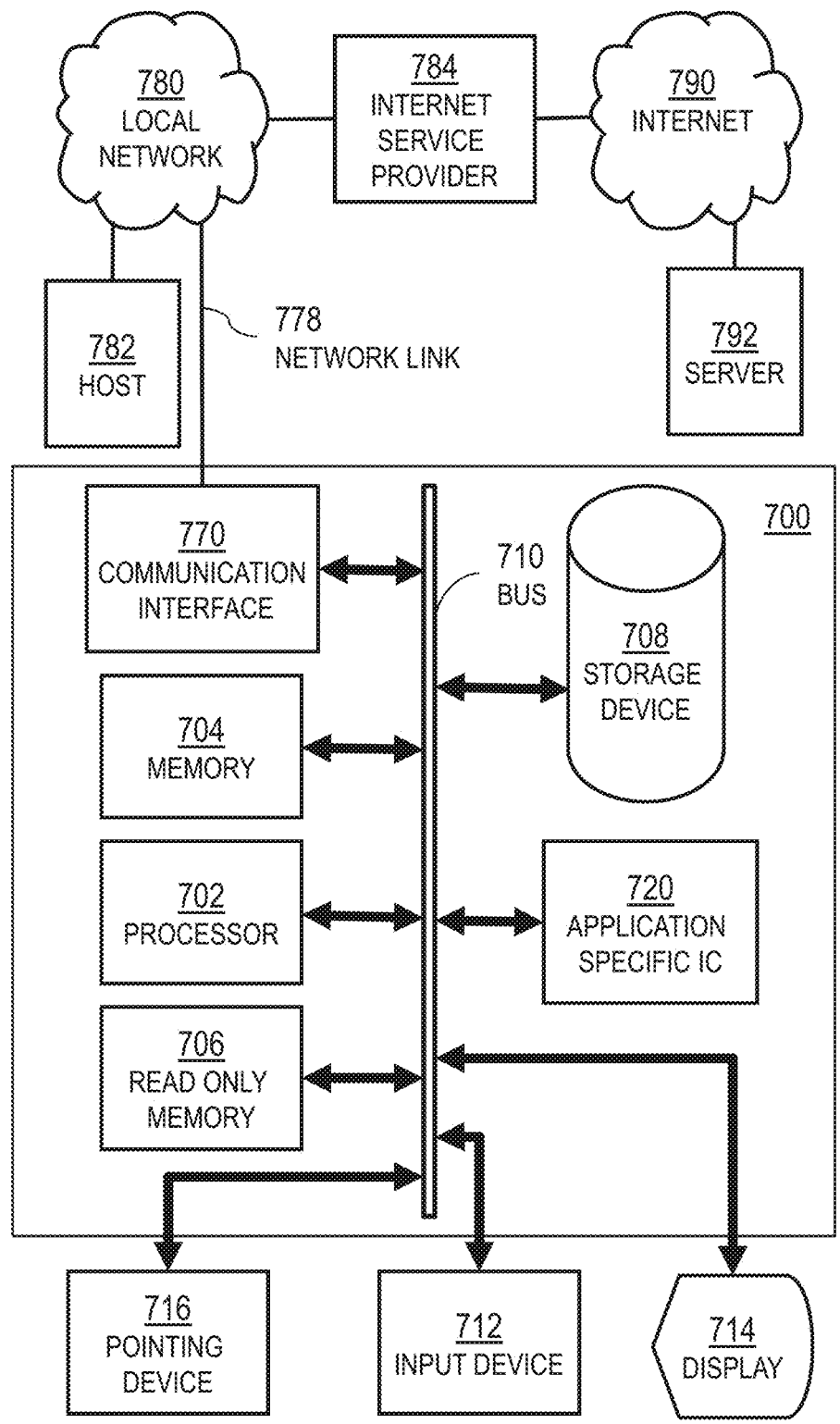
FIG. 7 is a block diagram that illustrates a computer system upon which an embodiment of the invention may be implemented.

FIG. 7 is a block diagram that illustrates a computer system 700 upon which an embodiment of the invention may be implemented. Computer system 700 includes a communication mechanism such as a bus 710 for passing information between other internal and external components of the computer system 700. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of one or more methods described herein.

A sequence of binary digits constitutes digital data that is used to represent a number or code for a character. A bus 710 includes many parallel conductors of information so that information is transferred quickly among devices coupled to the bus 710. One or more processors 702 for processing information are coupled with the bus 710. A processor 702 performs a set of operations on information. The set of operations include bringing information in from the bus 710 and placing information on the bus 710. The set of operations also typically include comparing two or more units of information, shifting positions of units of information, and combining two or more units of information, such as by addition or multiplication. A sequence of operations to be executed by the processor 702 constitutes computer instructions.

Computer system 700 also includes a memory 704 coupled to bus 710. The memory 704, such as a random access memory (RAM) or other dynamic storage device, stores information including computer instructions. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of computer instructions. The computer system 700 also includes a read only memory (ROM) 706 or other static storage device coupled to the bus 710 for storing static information, including instructions, that is not changed by the computer system 700. Also coupled to bus 710 is a non-volatile (persistent) storage device 708, such as a magnetic disk or optical disk, for storing information, including instructions, that persists even when the computer system 700 is turned off or otherwise loses power.

Information, including instructions, is provided to the bus 710 for use by the processor from an external input device 712, such as a keyboard containing alphanumeric keys operated by a human user, or a sensor. A sensor detects conditions in its vicinity and transforms those detections into signals compatible with the signals used to represent information in computer system 700. Other external devices coupled to bus 710, used primarily for interacting with humans, include a display device 714, such as a cathode ray tube (CRT) or a liquid crystal display (LCD), for presenting images, and a pointing device 716, such as a mouse or a trackball or cursor direction keys, for controlling a position of a small cursor image presented on the display 714 and issuing commands associated with graphical elements presented on the display 714.

In the illustrated embodiment, special purpose hardware, such as an application specific integrated circuit (IC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 770 sends and receives electrical, acoustic or electromagnetic signals, including infrared and optical signals, that carry information streams, such as digital data.

The term computer-readable medium is used herein to refer to any medium that participates in providing information to processor 702, including instructions for execution. Such a medium may take many forms, including, but not limited to, non-volatile media, volatile media and transmission media. Non-volatile media include, for example, optical or magnetic disks, such as storage device 708. Volatile media include, for example, dynamic memory 704. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 702, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 702, except for carrier waves and other signals.

Logic encoded in one or more tangible media includes one or both of processor instructions on a computer-readable storage media and special purpose hardware, such as ASIC 720.

Network link 778 typically provides information communication through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790. A computer called a server 792 connected to the Internet provides a service in response to information received over the Internet. For example, server 792 provides information representing video data for presentation at display 714.

The invention is related to the use of computer system 700 for implementing the techniques described herein. According to one embodiment of the invention, those techniques are performed by computer system 700 in response to processor 702 executing one or more sequences of one or more instructions contained in memory 704. Such instructions, also called software and program code, may be read into memory 704 from another computer-readable medium such as storage device 708. Execution of the sequences of instructions contained in memory 704 causes processor 702 to perform the method steps described herein. In alternative embodiments, hardware, such as application specific integrated circuit 720, may be used in place of or in combination with software to implement the invention. Thus, embodiments of the invention are not limited to any specific combination of hardware and software.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server 792 transmits program code for a particular application, requested by a message sent from computer 700, through Internet 790, ISP equipment 784, local network 780 and communications interface 770. The received code may be executed by processor 702 as it is received, or may be stored in storage device 708 or other non-volatile storage for later execution, or both. In this manner, computer system 700 may obtain application program code in the form of a signal on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red a carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

Figure 8:
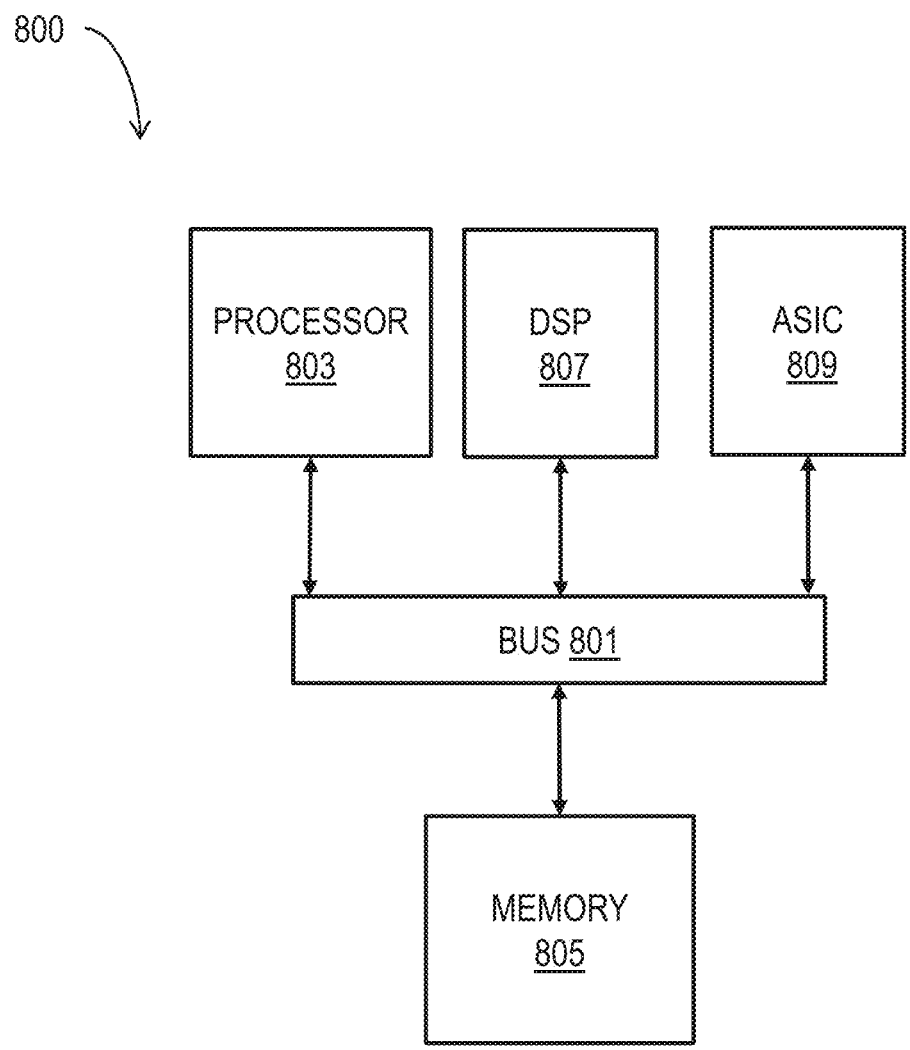
FIG. 8 illustrates a chip set upon which an embodiment of the invention may be implemented.

FIG. 8 illustrates a chip set 800 upon which an embodiment of the invention may be implemented. Chip set 800 is programmed to perform one or more steps of a method described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 800, or a portion thereof, constitutes a means for performing one or more steps of a method described herein.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 805 also stores the data associated with or generated by the execution of one or more steps of the methods described herein.

9. ALTERATIONS, EXTENSIONS AND MODIFICATIONS

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article.

What is claimed is:

1. An autonomous vehicle, comprising:
   a light detection and ranging (LIDAR) system, comprising:
      a waveguide array comprising a plurality of waveguides, the waveguide array configured to generate a plurality of beams in a first plane, each beam of the plurality of beams transmitted from a respective waveguide of the waveguide array;
      a collimator configured to receive the plurality of beams from the waveguide array and output a plurality of collimated beams in the first plane, the plurality of collimated beams defining an angular spread; and
      a first scanner configured to adjust a direction of the plurality of collimated beams to be in a second plane from the first plane, wherein the second plane is different than the first plane and the collimator is between the waveguide array and the first scanner;
   a steering system;
   a braking system; and
   one or more processors configured to:
      determine a range to an object based on a return signal received from reflection or scattering of the plurality of collimated beams by the object;
      identify a first angle and a second angle in the second plane;
      adjust, using the first scanner, a first component of the direction of the plurality of collimated beams, wherein the first component is a first incremental angle in the first plane;
      adjust, using the first scanner, a second component of the direction of the plurality of collimated beams, wherein the second component is a second incremental angle in the second plane between the first angle and the second angle; and
      switch, for each first component and second component, between a first waveguide of the waveguide array to emit a transmit beam of the plurality of collimated beams and a second waveguide of the waveguide array to receive a return beam corresponding to the return signal; and
      control operation of at least one of the steering system or the braking system based on the range.

2. The autonomous vehicle of claim 1, further comprising a second scanner configured to adjust the direction of the plurality of collimated beams to perform a sawtooth scan.

3. The autonomous vehicle of claim 1, wherein the first scanner is a polygon scanner configured to rotate about an axis of rotation at a constant speed.

4. The autonomous vehicle of claim 1, wherein the waveguide array comprises a first waveguide and a second waveguide, a spacing between the first waveguide and the second waveguide is greater than or equal to 100 micrometers (μm) and less than or equal to 1000 μm.

5. The autonomous vehicle of claim 1, wherein the angular spread is greater than or equal to 0.05 degrees and less than or equal to 10 degrees.

6. An autonomous vehicle control system, comprising:
   a LIDAR system comprising:
      a waveguide array configured to transmit a plurality of beams in a first plane;

a collimator configured to receive the plurality of beams from the plurality of waveguides and output a plurality of collimated beams in the first plane, the plurality of collimated beams defining an angular spread;

a first scanner configured to adjust a direction of the plurality of collimated beams to be in a second plane from the first plane, the second plane different than the first plane and the collimator is between the waveguide array and the first scanner; and one or more processors configured to:
identify a first angle and a second angle in the second plane;
adjust, using the first scanner, a first component of the direction of the plurality of collimated beams, wherein the first component is a first incremental angle in the first plane;
adjust, using the first scanner, a second component of the direction of the plurality of collimated beams, wherein the second component is a second incremental angle in the second plane between the first angle and the second angle; and
switch, for each first component and second component, between a first waveguide of the waveguide array to emit a transmit beam of the plurality of collimated beams and a second waveguide of the waveguide array to receive a return beam corresponding to the return signal; and a vehicle controller configured to control operation of an autonomous vehicle using a range to an object determined using a return signal received from reflection or scattering of the plurality of collimated beams by the object.

7. The autonomous vehicle control system of claim 6, wherein the first scanner comprises at least one of a reflective optic, a refractive optic, a galvanometer, a microelectromechanical systems (MEMS) mirror, a voice coil actuated mirror, or a polygon scanner.

8. The autonomous vehicle control system of claim 6, wherein the LIDAR system further comprises a second scanner configured to adjust the direction of the plurality of collimated beams in to be in a third plane from the second plane.

9. The autonomous vehicle control system of claim 8, wherein the second scanner is configured to adjust the direction of the plurality of collimated beams to perform a sawtooth scan.

10. The autonomous vehicle control system of claim 6, wherein the first scanner is a polygon scanner configured to rotate about an axis of rotation at a constant speed.

11. The autonomous vehicle control system of claim 6, wherein the waveguide array comprises a plurality of waveguides and defines a first spacing of the plurality of waveguides in a first region of the waveguide array and a second spacing of the plurality of waveguides in a second region of the waveguide array, wherein the first spacing is greater than the second spacing.

12. The autonomous vehicle control system of claim 6, wherein at least one of the scanner or a detector array is configured to receive the return signal.

13. A light detection and ranging (LIDAR) system, comprising:
a waveguide array comprising a plurality of waveguides, the waveguide array configured to generate a plurality of beams in a first plane, each beam of the plurality of beams transmitted from a respective waveguide of the waveguide array;

a collimator configured to receive the plurality of beams from the waveguide array and output a plurality of collimated beams in the first plane, the plurality of collimated beams defining an angular spread;

a first scanner configured to adjust a direction of the plurality of collimated beams to be in a second plane from the first plane, wherein the second plane is different than the first plane and the collimator is between the waveguide array and the first scanner; and one or more processors configured to:
identify a first angle and a second angle in the second plane;
adjust, using the first scanner, a first component of the direction of the plurality of collimated beams, wherein the first component is a first incremental angle in the first plane;
adjust, using the first scanner, a second component of the direction of the plurality of collimated beams, wherein the second component is a second incremental angle in the second plane between the first angle and the second angle; and
switch, for each first component and second component, between a first waveguide of the waveguide array to emit a transmit beam of the plurality of collimated beams and a second waveguide of the waveguide array to receive a return beam corresponding to the return signal.

14. The LIDAR system of claim 13, wherein the collimator is configured to shape the plurality of beams into a fan of the plurality of collimated beams.

15. The LIDAR system of claim 13, wherein the collimator is configured to define the angular spread for an object in an environment.

16. The LIDAR system of claim 13, wherein the first scanner is configured to rotate about an axis of rotation at a constant speed.

17. The LIDAR system of claim 13, wherein the first plane intersects an axis of rotation of the first scanner and the waveguide array is arranged parallel to the axis of rotation.

18. The LIDAR system of claim 13, wherein the waveguide array defines a first spacing of the plurality of waveguides in a first region of the waveguide array and a second spacing of the plurality of waveguides in a second region of the waveguide array, wherein the first spacing is greater than the second spacing.

19. The LIDAR system of claim 13, wherein the first scanner is configured to perform a plurality of interleaved outputs by adjusting a direction of the plurality of collimated beams by an incremental angle between at least a first interleaved output of the plurality of interleaved outputs and a second interleaved output of the plurality of interleaved outputs.

* * * * *